(12) United States Patent
Kulewski et al.

(10) Patent No.: US 10,101,891 B1
(45) Date of Patent: Oct. 16, 2018

(54) COMPUTER-ASSISTED IMAGE CROPPING

(71) Applicant: Google Inc., Mountain View, CA (US)

(72) Inventors: Krzysztof Kulewski, Sunnyvale, CA (US); Jordi Miguel Verdu Orts, San Francisco, CA (US); John Thomas Nack, San Jose, CA (US); Sevket Derin Babacan, San Francisco, CA (US); Juan Carlos Miguel Anorga, San Francisco, CA (US)

(73) Assignee: Google LLC, Mountain View, CA (US)

( * ) Notice: Subject to any disclaimer, the term of this patent is extended or adjusted under 35 U.S.C. 154(b) by 261 days.

(21) Appl. No.: 15/080,271

(22) Filed: Mar. 24, 2016

Related U.S. Application Data

(60) Provisional application No. 62/139,604, filed on Mar. 27, 2015.

(51) Int. Cl.
*G06F 13/00* (2006.01)
*G06F 15/00* (2006.01)
*G06F 3/0484* (2013.01)
*G06T 3/40* (2006.01)

(52) U.S. Cl.
CPC ............ *G06F 3/04845* (2013.01); *G06T 3/40* (2013.01); *G06T 2200/24* (2013.01)

(58) Field of Classification Search
CPC ........................ G06F 3/04845; H04N 1/3875

USPC ................. 715/841, 853, 740, 748
See application file for complete search history.

(56) References Cited

U.S. PATENT DOCUMENTS

| | | | |
|---|---|---|---|
| 7,675,528 B2 | 3/2010 | Walker et al. | |
| 9,279,983 B1* | 3/2016 | Davis | G02B 27/01 |
| 2002/0191861 A1 | 12/2002 | Cheatle | |
| 2004/0239982 A1 | 12/2004 | Gignac | |
| 2005/0025387 A1* | 2/2005 | Luo | H04N 1/3875 |
| | | | 382/298 |
| 2009/0251594 A1 | 10/2009 | Hua et al. | |
| 2010/0073402 A1 | 3/2010 | Delia et al. | |
| 2013/0016122 A1* | 1/2013 | Bhatt | G06F 3/04845 |
| | | | 345/620 |

* cited by examiner

*Primary Examiner* — Kevin Nguyen
(74) *Attorney, Agent, or Firm* — IP Spring

(57) ABSTRACT

Implementations relate to computer-assisted cropping of an image. A computer-executed method includes receiving user input indicative of a change in size of a crop window from a first size to a second size, where the crop window is displayed over an image in an image editing user interface. The method detects that the crop window of the second size has an aspect ratio within a threshold range of a predetermined aspect ratio. In response to the detection, the method resizes the crop window to a third size, where the crop window of the third size has a resized aspect ratio substantially the same as the predetermined aspect ratio.

20 Claims, 14 Drawing Sheets

COMPUTER-ASSISTED IMAGE CROPPING

CROSS-REFERENCE TO RELATED APPLICATIONS

The present application claims priority to U.S. Provisional Application No. 62/139,604, filed Mar. 27, 2015 and titled COMPUTER-ASSISTED IMAGE CROPPING, which is incorporated herein by reference in its entirety.

BACKGROUND

The popularity and convenience of digital cameras as well as the widespread of use of Internet communications have caused images such as photographs to become ubiquitous. For example, users can keep large private collections of images they have captured and otherwise received. Many users of Internet platforms and services such as email, bulletin boards, forums, and social networking services post images for themselves and others to view. Some users use image editing applications running on devices to edit their images using a variety of editing tools included in the applications.

SUMMARY

Implementations of the present application relate to computer-assisted cropping of an image. In some implementations, a method includes receiving user input indicative of a change in size of a crop window from a first size to a second size, where the crop window is displayed over an image in an image editing user interface. The method detects that the crop window of the second size has an aspect ratio within a threshold range of a predetermined aspect ratio. In response to the detection, the method resizes the crop window to a third size, where the crop window of the third size has a resized aspect ratio substantially the same as the predetermined aspect ratio.

Various implementations and examples of the method are described. For example, the threshold range can include a first threshold range used in response to the crop window of the first size having an aspect ratio substantially the same as the predetermined aspect ratio, where the third size is the same as the first size. A second threshold range can be used in response to the crop window of the first size not having an aspect ratio substantially the same as the predetermined aspect ratio. The first threshold range can be different than the second threshold range.

Resizing the crop window to a third size can include resizing the crop window to be displayed within the boundaries of the image. The method can further include determining that the crop window of the third size is at least partially outside one or more boundaries of the image, and resizing the crop window to a fourth size displayable within the boundaries of the image, where the fourth size has an aspect ratio substantially the same as the predetermined aspect ratio. The crop window of the third size can be at least partially outside one or more boundaries of the image based on user input providing at least one of: movement of the crop window with respect to the image, and resizing of the crop window of the first size. Resizing the crop window to the third size can include updating a height of the crop window, a width of the crop window, or the height and the width of the crop window of the second size. The resizing can include resizing the sides of the crop window that are connected to or are closest to one or more portions of the crop window that were changed by the user. The third size can be equal to or larger than a predetermined minimum size.

The method can further comprise displaying the crop window including a visual indication that the crop window has been resized to the third size. The predetermined aspect ratio can include a first predetermined aspect ratio and a second predetermined aspect ratio, where the crop window of the third size can have an aspect ratio substantially the same as the first predetermined aspect ratio in response to the crop window of the second size having an aspect ratio within a threshold range of the first predetermined aspect ratio. Further, the crop window of the third size can have an aspect ratio substantially the same as the second predetermined aspect ratio in response to the crop window of the second size having an aspect ratio within a threshold range of the second predetermined aspect ratio. The detecting can include determining an angle between diagonals (e.g., where each diagonal connects two opposite-corner vertices of the crop window) or an angle between a diagonal and an edge of the crop window of the second size. The detecting can include determining an arithmetic mean of the height and width of the crop window of the second size and checking whether the crop window of the second size has a height and width within a predetermined threshold of the arithmetic mean.

In some implementations, a system can include a storage device and at least one processor accessing the storage device and configured to perform operations. The operations can include causing a display of a crop window of a first size in an image editing interface, where the crop window is displayed within boundaries of an image. The operations include receiving user input indicative of a resize to update the size of the crop window. In response to the user input, the operations resize the crop window to a second size, where the crop window of the second size has at least one vertex positioned outside one or more of the boundaries of the image. The operations detect whether the crop window of the second size has an aspect ratio within a threshold range of a predetermined aspect ratio. In response to the detection, the operations resize the crop window to a third size, where the crop window of the third size is sized substantially to the predetermined aspect ratio, and positioned within the boundaries of the image.

In various implementations of the system, the user input can include one or more of: a drag operation of a vertex of the crop window, a drag operation of an edge of the crop window, and a drag operation of the crop window. The operations can further include receiving user input causing relative motion between the crop window of the first size and the image, where the relative motion includes at least one of relative rotation of the image with respect to the crop window of the first size, and relative translation of the image with respect to the crop window of the first size; and resizing the crop window to be displayed within the boundaries of the image. The operations can cause a display of an animation of the crop window moving from a position outside the one or more boundaries of the image to a position within the boundaries of the image.

Resizing the crop window to a third size can include extending lines between corresponding vertices of the crop window of the first size and the crop window of the second size to determine one or more intersections with one or more boundary lines of the image, and determining the crop window of the third size based on a selected one of the one or more intersections with the one or more boundary lines of the image. The crop window of the first size and the crop window of the second size can each have a first vertex and a second vertex, where the second vertex of the crop window of the second size is positioned outside one or more of the boundaries of the image, and resizing the crop window to a third size includes: extending lines between corresponding vertices of the crop window of the first size and the crop window of the second size for intersection with one or more boundary lines of the image; and determining the crop window of the third size as having a first vertex substantially the same as the first vertex of the crop window of the first size and a second vertex at or inside a selected one of the intersections with the one or more boundary lines of the image that is nearest to the second vertex of the crop window of the first size.

In some implementations, a computer readable medium has stored thereon software instructions that, when executed by a processor, cause the processor to perform operations including receiving user input indicative of a change in size of a crop window from a first size to a second size, where the crop window is displayed over an image in an image editing user interface. The operations include detecting that the crop window of the second size has an aspect ratio within a threshold range of a predetermined aspect ratio. In response to the detection, the operations display the crop window with a third size over the image in the image editing user interface, where the crop window of the third size has a resized aspect ratio substantially the same as the predetermined aspect ratio. The operations cause a display of a visual indication that the crop window has been resized to the third size.

In various implementations of the computer readable medium, the processor further performs operations comprising determining that the crop window of the third size is at least partially outside one or more boundaries of the image based on user input providing movement of the crop window with respect to the image and/or resizing of the crop window of the first size, and resizing the crop window to a fourth size displayable within the boundaries of the image, wherein the fourth size has an aspect ratio substantially the same as the predetermined aspect ratio. The visual indication that the crop window has been resized to the third size can include a preview crop window, and the operations can further include receiving user input confirming to resize the crop window of the second size to the third size.

DETAILED DESCRIPTION

Figure 1:
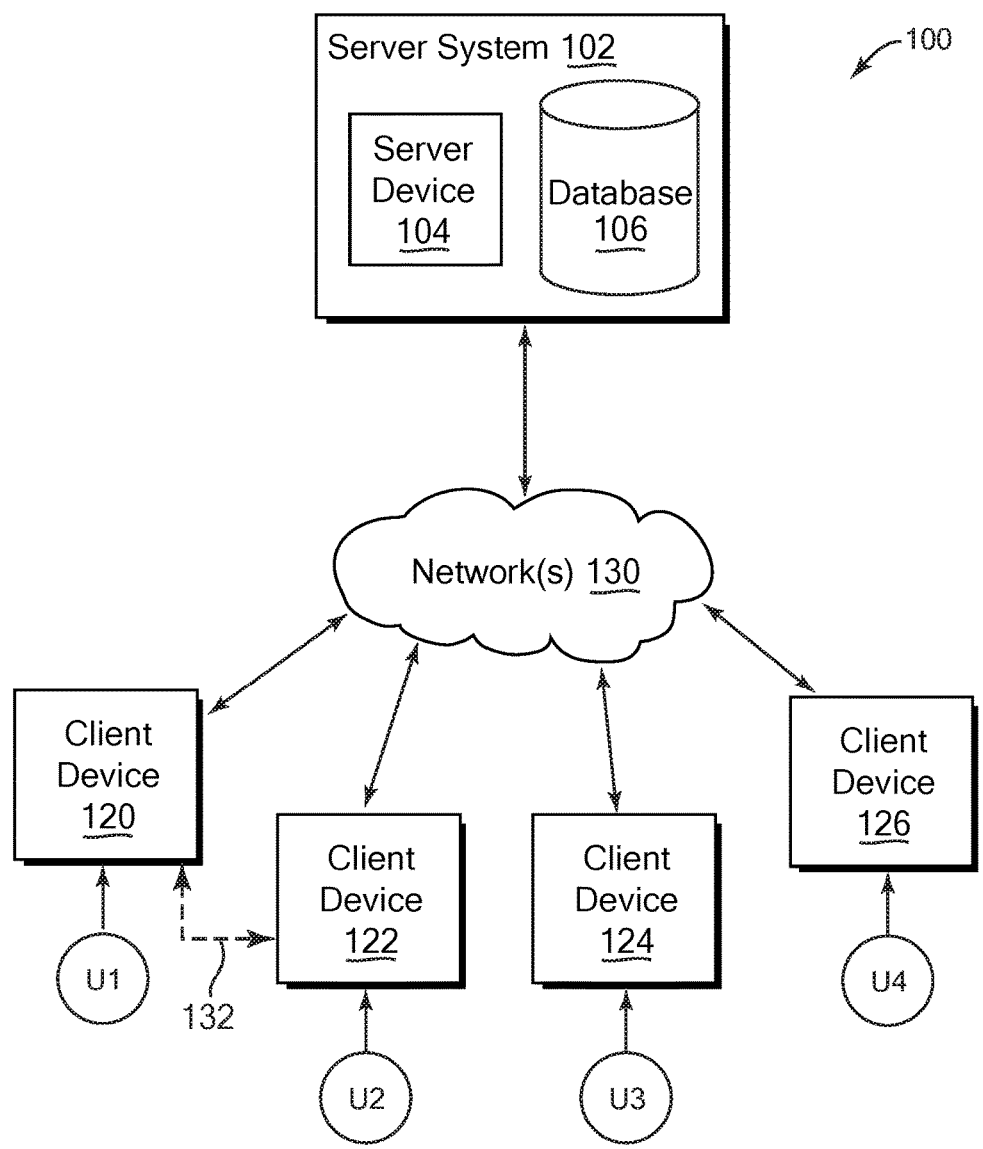
FIG. 1 is a block diagram of an example network environment which may be used for one or more implementations described herein.

One or more implementations described herein relate to computer-implemented techniques to assist cropping of images. In some implementations, techniques used by a system can detect that a user is resizing a crop window for an image displayed in an editing interface provided on a device. As the user adjusts the crop window, the system can detect when the crop window aspect ratio is close to (e.g., exactly equal to, substantially equal to, or within a threshold range of) a predetermined aspect ratio. For example, the predetermined aspect ratio can be a commonly-used aspect ratio, such as a 1:1 aspect ratio, 3:2 aspect ratio, etc. In certain implementations, if the aspect ratio is close to the predetermined aspect ratio, then the system can resize the crop window to have the predetermined aspect ratio, e.g., automatically. For example, the system can "snap" the crop window to the predetermined aspect ratio, and/or "lock" the crop window to the predetermined aspect ratio, while it is in the threshold range. In some example implementations, the system can display one or more indications related to resizing the crop window to assist the user. For example, the indications can include displaying the crop window in a particular color and/or with a visual pattern (e.g., dotted lines), etc., or displaying an indicator separate from the crop window. In some examples, the indication can be displayed while the crop window is within the threshold range and/or has been resized by the system. Some example implementations can prompt the user to confirm the resizing of the crop window before it is performed.

In some implementations, the system can detect whether a user-modified crop window is at least partially outside the boundaries of an image, after the user has provided input to modify the crop window and/or image. For example, the user may resize the crop window as described above, and/or may translate or rotate the crop window with respect to the image, causing the modified crop window to be at least partially outside the image boundaries. The system can change (e.g., reposition, translate, and/or resize) the user-modified crop window so that it is fully within the image boundaries and so that it is within a predefined range of the size and position of the user-modified crop window. In some examples, the system can examine lines extending between vertices of the original crop window and the modified crop window to find intersection points with image boundaries, indicating where the changed crop window should be placed.

Features described herein allow user modifications to a crop window to be more easily performed. For example, the system can examine a user's manipulation of a crop window and, if the crop window is sufficiently close in aspect ratio, snap to a commonly-used predetermined aspect ratio that the user has designated for use. For example, many users commonly crop their photos to aspect ratios such as 1:1 or other aspect ratios for particular purposes. In some examples, users may upload images to online services that may require the images to have a particular aspect ratio in order for the services to display the images, may fit an image to a particular display screen aspect ratio (e.g., for screens of computing devices, television screens, etc.), and/or may organize their collections of images into uniform standard aspect ratios. Described features such as automatic notification of the desired aspect ratio to the user and/or an automatic (or user-prompted) resizing of the crop window to the desired aspect ratio may allow quick cropping of a desired portion of an image at the aspect ratio. For example, a maximum available area of an image may be retained (e.g., within the crop window) while conforming the cropped image to a desired aspect ratio.

Other features can allow a system to automatically change a crop window to fit within image boundaries if a modified window is outside the boundaries (or change the crop window based on user confirmation). For example, the system can change a crop window to fit the image boundaries while maintaining the crop window close to the modifications that the user desired in position and size. The user can thus be allowed to freely modify a crop window within an editing interface as he or she desires, such as by translating, rotating, and/or resizing the crop window and/or image, without being prevented from doing so by the interface and/or without having to worry about fitting the modified crop window into image boundaries.

Thus, operations described herein can help improve user edits to images, as well as provide users more editing options. Consequently, a technical effect of one or more described implementations is that image editing tasks may be reduced in time and resources expended to obtain accurate results. A further technical effect may be a reduction in the time and resources needed to achieve desired crop windows used to implement editing tasks.

A "resizing" of a crop window as described herein can refer to a change in shape of the crop window (e.g., a change in aspect ratio, adding or subtracting segments and/or vertices, etc.), and/or refer to a change in scale of the crop window, e.g., a crop window becoming smaller or larger without necessarily changing relative dimensions between the segments or other portions of the crop window. Similarly, a different "size" of a crop window relative to a previous size can include a different scale and/or different shape for the crop window relative to a previous scale and/or shape.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example.

Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service implemented on server system 102. For example, respective client devices 120, 122, 124, and 126 may communicate data to and from one or more server systems (e.g., system 102). In some implementations, server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface can enable display of images, video data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image editing application. The image editing application can provide options for editing and displaying various characteristics of an image, some examples of which are described herein. The image editing program can provide an associated user interface that is displayed on a display device associated with the server system or client device. The user interface may provide various options to a user to select images and editing options, editing modes, display modes, etc. for the selected images. The image editing user interface may provide, for example, one or more crop windows and related tools as described herein.

Other implementations of features described herein can use any type of system and/or service. For example, photo collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
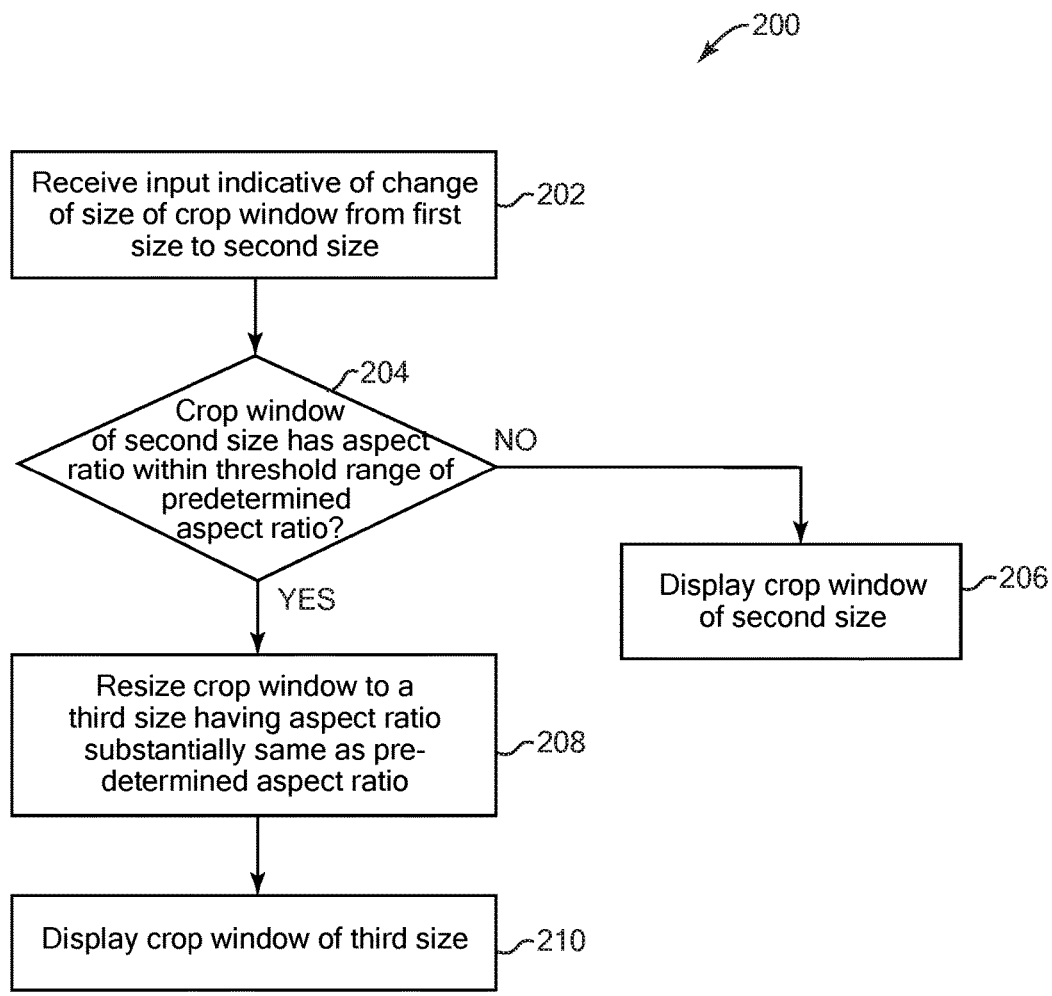
FIG. 2 is a flow diagram illustrating an example method to assist cropping of images, according to some implementations.

FIG. 2 is a flow diagram illustrating one example of a method 200 to assist cropping of images. In some implementations, method 200 can be implemented, for example, on a server system 102 as shown in FIG. 1. In some implementations, some or all of the method 200 can be implemented on a system such as one or more client devices 120, 122, 124, or 126 as shown in FIG. 1, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200.

An image as described herein can be a digital image composed of multiple pixels, for example. The image can be stored on one or more storage devices of the system or otherwise accessible to the system, such as a connected storage device, e.g., a local storage device or storage device connected over a network. In various implementations, the image can be obtained from a variety of sources, e.g., uploaded by a user from a client device to a server over one or more networks, an image from an album or other stored collection of multiple images owned by a user and stored on a client or server system, etc.

Editing tools available in an image editing user interface can include a cropping tool. The cropping tool can be used to crop an image, e.g., select a portion of an image to retain for the cropped image and remove (e.g., delete, deselect, hide from the display, etc.) other portions of the image. For example, a cropping tool can cause a display of a crop window over or on top of an image to be edited (e.g., as an overlay). For example, the crop window in some implementations can be an outline or border for a window shape and having a transparent interior to the window allowing the pixels of the overlaid image to be at least partially displayed and viewed. The area of the image within the crop window is considered the selected portion of the image. The area of the image outside the crop window is the other portion to be removed from the cropped image.

In some examples of method 200, a crop window used for cropping images is displayed by a display of a device, e.g., on a display screen within an image editing user interface over a displayed image. In some implementations, the crop window is rectangular in shape. Other shapes of crop windows can be provided and displayed, e.g., circular, triangular, polygonal, or an outline of any shape. For example, the shape can be irregularly-shaped, open-sided (e.g., having one or more unjoined segments of the window), etc.

Herein, the terms "horizontal" and "vertical" refer to approximately perpendicular axes of a display area in which the crop window is displayed, and in some cases can be in reference to an orientation of a user's current viewpoint. In some implementations these axes can be defined by borders of the display area, e.g., edges of a display area that is a display screen or display window.

In block 202 of method 200, user input indicative of a change of size of a crop window from a first size to a second size may be received. In some examples, the crop window of the first size can be displayed by a display device, e.g., a display screen. For example, the crop window can be displayed in an image editing user interface as described above. The user input can be provided by a user with a variety of user input devices, including touchscreen, mouse, voice recognition via a microphone, or other input device.

For example, if the crop window is displayed on a touchscreen receptive to user touch, the user can provide the input by physically touching the touchscreen (e.g., with a finger). For example, the user can select a displayed portion of the crop window substantially corresponding to a location on the touchscreen. In some implementations, the user input can be received as a command provided by the user to select a displayed portion, e.g., a voice recognized command, selected menu command, text command, etc. In some implementations, the user input can be received via control of a displayed cursor using an input device such as a mouse, joystick, trackpad, etc., where the cursor can be used to select a portion of the crop window.

In some examples, the user input can include input that causes a repositioning or otherwise moves a particular (e.g., a selected) portion of the crop window to change the window from the first size to the second size. In some cases, one or more unselected portions of the crop window can remain stationary on the display as a moved portion of the crop window is moved. For example, a selected portion of the crop window can be a vertex of the crop window. When the user drags his or her selecting finger across the touchscreen, the vertex is moved correspondingly with the user's finger. In some implementations, this movement of a vertex causes the crop window to change in size relative to the distance or amount the vertex is moved. For example, for a rectangular crop window, the distance the vertex is moved along two directional axes of the display area (e.g., horizontal and/or vertical axes of a display screen or display window) scales the dimension(s) of the crop window along the axis or axes corresponding to the movement (e.g., the horizontal and/or vertical dimensions of the crop window). For example, if the user moves the vertex substantially along a horizontal axis, the corresponding dimension of the crop window is changed by a magnitude in accordance with the distance moved, and in a direction (larger or smaller) in accordance with the direction of vertex movement along the horizontal axis. For example, the crop window can be scaled larger in size in the corresponding dimension if the vertex movement is away from the center of the crop window (or away from the opposite corner vertex or window side), and can be scaled smaller in size if the vertex movement is toward the center of the crop window (or toward the opposite corner vertex or window side). Vertex movement along a line that intersects opposite corners of a rectangular crop window (including the moved vertex) can cause the aspect ratio (e.g., shape) of the crop window to remain approximately constant during and after movement of the vertex, while movement of the vertex in other directions or axes can change the size of the crop window in both scale and shape.

In another example, the selected portion of the crop window can be a segment (e.g., side of a polygon, or portion of a side) of the crop window, such that if the user drags his or her selecting finger across the touchscreen, the segment is moved with the user's finger. This can cause the shape of the crop window to change in accordance with the movement, e.g., stretch the shape along the dimension corresponding to the movement direction if the segment is moved away from the center of the crop window, and shrink the shape based on the opposite direction. In some implementations, a selected segment can be constrained in its movement or repositioning to a particular dimension or direction. For example, user input selecting a segment of a rectangular crop window may be allowed to move the selected segment only approximately along a single axis perpendicular to the orientation of the segment. In other examples, user input can resize the crop window as described above, as well as translate or rotate the crop window with respect to the image, as described in greater detail below.

In some implementations, the change of the crop window from the first size to the second size can be immediately displayed and updated on the display screen, e.g., during movement of a vertex or segment and/or after movement over a predetermined distance. Other implementations can delay updating the display of the crop window until later in method 200.

In block 204, it is determined whether the crop window of the second size has an aspect ratio within a threshold range of a predetermined aspect ratio. The aspect ratio can be determined in a (e.g., predetermined) consistent way. For example, for a rectangular crop window, the aspect ratio can be the dimension of the crop window along a first axis (e.g., horizontal axis) divided by the dimension along a second axis (e.g., vertical axis). For other shapes of crop windows, the aspect ratio can be determined differently. For example, for a circular crop window, the aspect ratio can be radius or diameter of the window; for an elliptical crop window, the aspect ratio can be a ratio of the axes of the ellipse; for a polygon, dimensions and/or ratios of other axes can be used, or the aspect ratio can be defined as the shape of the crop window. The threshold range can be specified in any suitable manner. For example, the threshold range can be a range of ratios above and below the predetermined aspect ratio.

The predetermined aspect ratio can be a stored aspect ratio defined by the system or by a user. For example, if defined by the system as a default, the predetermined aspect ratio can be a commonly-used aspect ratio used by many users or systems. In some examples, a particular aspect ratio can be a default for the system, e.g., based on user preferences and/or popular uses of that particular aspect ratio (e.g., popular online service aspect ratio requirements for uploaded images to be posted on the service or sent to other users). Some common predetermined aspect ratios for rectangular crop windows can include 1:1, 3:2, 4:3, 5:4, 7:5, 16:9, etc. Some implementations can allow the user to input a custom predetermined aspect ratio. For example, a menu of commonly-used aspect ratios can be presented to the user for selection as one or more predetermined aspect ratios. Other shapes of crop windows can use other predetermined aspect ratios, e.g., a ratio of axes of the window, a defined shape as aspect ratio, etc. For example, the predetermined aspect ratio can be designated as a perfect circle for a circular crop window. In some implementations, a predetermined aspect ratio can include one or more predetermined dimensions, such as a rectangle with a set of particular dimensions (e.g., specified in pixels, inches, etc.), a circular shape with a radius having a particular dimension, and/or multiple sets of such particular dimensions.

If it is determined that the aspect ratio of the crop window of the second size is not within the threshold range of the predetermined aspect ratio, then the method continues to block 206 to cause a display of the crop window of the second size. If the aspect ratio is found to be within the threshold range of the predetermined aspect ratio, then in block 208 the method resizes the crop window to a third size that has an aspect ratio substantially the same as the predetermined aspect ratio. In some implementations, the method can "snap" the aspect ratio of the crop window to the predetermined aspect ratio. For example, if the predetermined aspect ratio is 1:1 (a square), and the threshold range is 0.05, then if the crop window of the second size has an aspect ratio between 1:0.95 and 1:1.05, it falls within the threshold range. The crop window is resized to the aspect ratio substantially the same as 1:1. In some implementations, this resizing (snapping) can be automatically performed by the method. In some implementations, the resizing can be performed based on confirming user input, as described below.

The resizing of the crop window to the third size can be implemented in various ways. In some examples, the method can check if the crop window is too wide or too tall compared to the predetermined aspect ratio. If so, the method increases the proper dimension of the crop window to achieve the predetermined aspect ratio. In some examples, the method can reduce a dimension of the crop window to achieve the predetermined aspect ratio. In some implementations, the method can resize the sides of the crop window that are connected to or are closest to the portion(s) of the crop window that were changed by the user. For example, if a vertex of the crop window was moved, the sides of the crop window connected to that vertex can be moved (resized) to achieve the predetermined aspect ratio in block 208, e.g., allowing one or more other vertexes of the crop window to remain in the same location as the crop window of the first size. If a segment of the crop window was moved, then that same segment can be resized to achieve the third size. In some implementations, other sides of the crop window can be moved to resize the crop window to the third size.

In some implementations, the crop window can also be adjusted to be above a (e.g., predetermined) minimum crop window size allowed by the method. For example, the method can check if the crop window resized in block 208 has a size below the minimum crop window size. If so, the method increases the smaller dimension of the crop window by extending one or more sides of the crop window to provide the minimum allowable dimension for the crop window. The method can extend a side of the crop window in the other axis to maintain the predetermined aspect ratio. The resulting crop window can be of the third size.

In some implementations, the method can adjust a rectangular crop window to the smallest rectangle substantially having the predetermined aspect ratio. Such a rectangle may have dimensions equal to or larger than the crop window of the second size. Such a rectangle may further have dimensions equal to or larger than the minimum crop window size allowed by the method. In some examples, the method can increase the smaller dimension of the crop window and then increase the other dimension, if needed, to maintain the predetermined aspect ratio similarly as described above.

In block 210, the method causes a display of the crop window of the third size. For example, in some implementations, the crop window of the second size may have been displayed in block 202, and the crop window size is changed to the third size in block 208. In some implementations, the crop window of the second size is no longer displayed if resizing is performed in block 208, such that the crop window is displayed from the first size directly to the third size. Some implementations can maintain a display or indication of an (old) crop window of the second size even after changing the crop window to the third size on the display, e.g., for a limited period of time before removing the displayed indication of the old crop window size.

In some implementations, after block 206 or block 210, the method can return to block 202 if conditions are appropriate, e.g., if more user input is received that causes change to the size of the crop window.

In some implementations, a resizing operation can be applied for a crop window of the first size that does not have an aspect ratio substantially the same as the predetermined aspect ratio. In some implementations, one or more different blocks can be performed if the crop window of the first size already has the predetermined aspect ratio. For example, if the crop window of the first size has an aspect ratio substantially the same as the predetermined aspect ratio, then block 204 can check for threshold range of the second size, block 208 can resize the crop window back to the first size (e.g., return the crop window to the first size), and block 210 can display the crop window at the first size (e.g., maintain the crop window at the first size if the second size was never displayed). Thus, the third size as described in method 200 can be the same as the first size in such a case. This can cause the crop window to continue to be "snapped to" or locked to the predetermined aspect ratio until the crop window is resized to a second size that is beyond or outside the threshold range. In one example, the method 300 of FIG. 3 can implement such a case, e.g., if the first and second thresholds of method 300 are the same.

Figure 3:
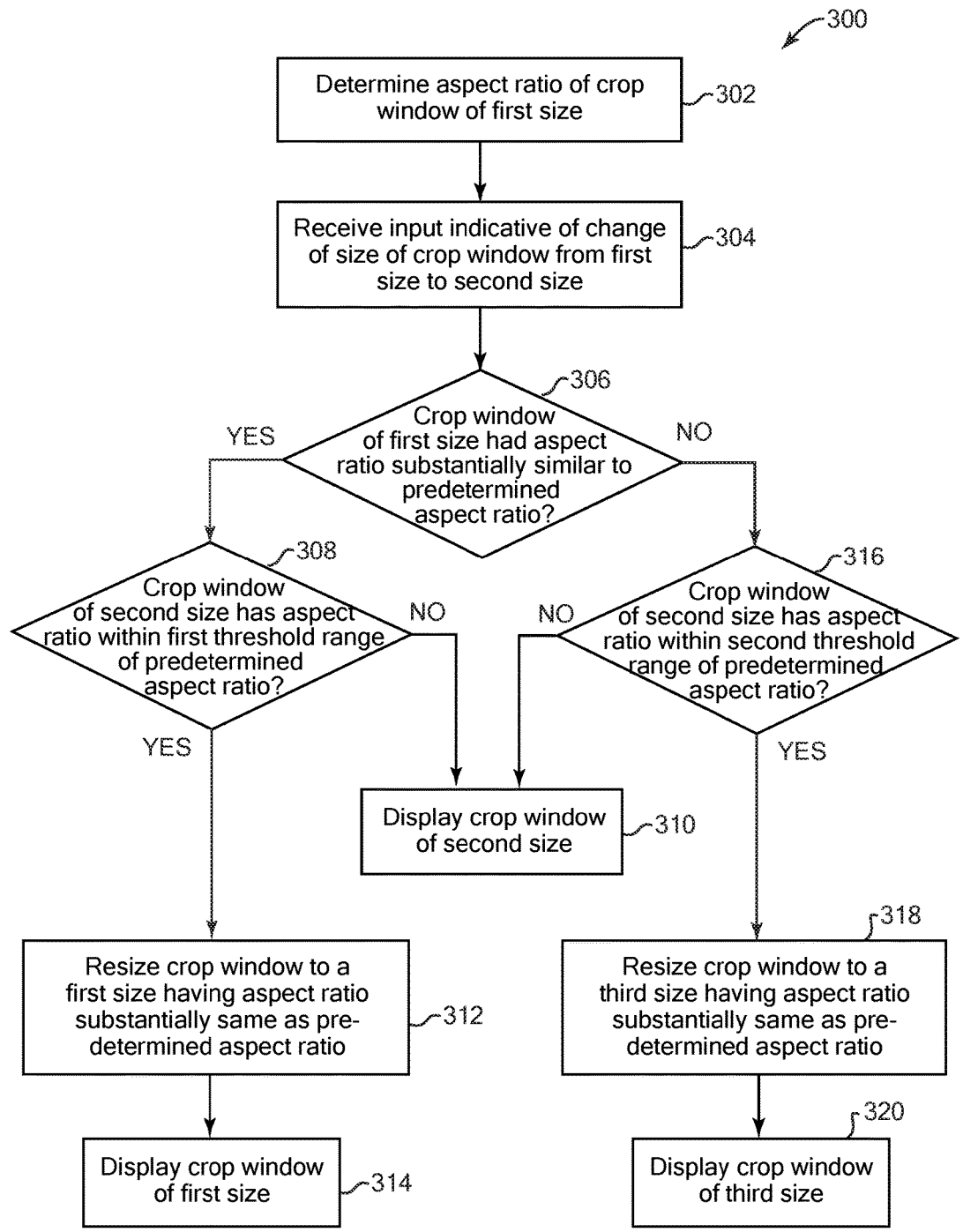
FIG. 3 is a flow diagram illustrating another example method to assist cropping of images, according to some implementations.

FIG. 3 is a flow diagram illustrating another example method 300 to assist cropping of an image. Method 300 can be implemented by system(s) similarly as described above for method 200. For example, method 300 can be performed in place of method 200 in some implementations.

In block 302, an aspect ratio of a displayed crop window of a first size is determined, e.g., a crop window displayed in an image editing user interface as described above with respect to FIG. 2. The aspect ratio can be determined similarly as described above for FIG. 2. This aspect ratio is stored and is associated with the crop window of the first size.

In block 304, user input indicative of a change of size of a crop window from a first size to a second size is received. For example, this block can be similar to block 202 of FIG. 2.

In block 306, it is checked whether the crop window of the first size had an aspect ratio substantially similar to the predetermined aspect ratio. The aspect ratio of the crop window of the first size can be read from storage, and the predetermined aspect ratio can be determined similarly as described above for FIG. 2. If the crop window of the first size did not have an aspect ratio substantially the same as the predetermined aspect ratio, then the method continues to block 316, described below. If the crop window of the first size had an aspect ratio substantially the same as the predetermined aspect ratio, then the method continues to block 308.

Block 308 is performed if the crop window of the first size had an aspect ratio substantially similar to the predetermined aspect ratio. This indicates that the crop window started the method in the predetermined aspect ratio. In block 308, it is checked whether the crop window of the second size has an aspect ratio within a first threshold range of a predetermined aspect ratio. The first threshold range and predetermined aspect ratio are similar to the threshold range and predetermined aspect ratio described above with reference to block 204. Thus it is checked whether the crop window of the second size has been sufficiently changed relative to the first size to "unsnap" the crop window out of the predetermined aspect ratio. In one example, the predetermined aspect ratio is 1:1 (a square), and the first threshold range is 0.09. Thus, if the crop window of the second size has an aspect ratio between 1:0.91 and 1:1.09, it falls within the first threshold range. Other aspect ratios and/or threshold ranges can be used in other implementations.

If it is determined that the aspect ratio of the crop window of the second size is not within the first threshold range of the predetermined aspect ratio, then the method continues to block 310. In block 310, a crop window of the second size is displayed. The method can continue iteratively as further user input is received, e.g., return to block 302 or 304.

If in block 308 it is determined that the aspect ratio of the crop window of the second size is within the first threshold range of the predetermined aspect ratio, then in block 312 the crop window is resized to the first size that had an aspect ratio substantially the same as the predetermined aspect ratio. This can be performed similarly as described above for FIG. 2. For example, the crop window is returned to the aspect ratio substantially the same as 1:1 in the example continuing from block 308. In block 314, the crop window of the first size is displayed. The method can continue iteratively as further user input is received, e.g., return to block 302 or 304.

Block 316 is performed if it is determined that the crop window of the first size did not have an aspect ratio substantially the same as the predetermined aspect ratio. In block 316, it is checked whether the crop window of the second size has an aspect ratio within a second threshold range of the predetermined aspect ratio. The second threshold range and predetermined aspect ratio are similar to the threshold range and predetermined aspect ratio described above with reference to block 204. The method thus checks whether the crop window of the second size has been changed sufficiently to snap the crop window into the predetermined aspect ratio.

In some implementations, the first threshold range and second threshold range are the same (and, in some implementations, can be implemented as a single threshold range as described with reference to FIG. 2.) In some implementations, the second threshold range is different than the first threshold range. For example, the second threshold range can be less than the first threshold range. In one example, the predetermined aspect ratio is 1:1, the first threshold range (e.g., margin above and below the predetermined aspect ratio) can be 0.09, and the second threshold range (e.g., margin above and below the predetermined aspect ratio) can be 0.05. Since a larger first threshold range applies if the crop window of the first size had started with the predetermined aspect ratio, that crop window is made more difficult to "unsnap" out of the predetermined aspect ratio than to "snap" a crop window into the predetermined aspect ratio. Thus the first threshold requires a greater change in the crop window to unsnap out of the predetermined aspect ratio than the change needed to snap into the predetermined aspect ratio from outside the predetermined aspect ratio using the second threshold range. In other implementations, the first and second threshold ranges can be the same, e.g., a single threshold range used in method 300.

If block 316 determines that the aspect ratio of the crop window of the second size is not within the second threshold range of the predetermined aspect ratio, then the method continues to block 310 to display the crop window of the second size. If it is determined in block 316 that the aspect ratio is within the second threshold range, then in block 318 the method resizes the crop window to a third size that has an aspect ratio substantially the same as the predetermined aspect ratio, e.g., similarly as described for FIG. 2. For example, the crop window can be resized to an aspect ratio substantially the same as a predetermined aspect ratio of 1:1. In block 320, the crop window of the third size is displayed, which can be implemented similarly as block 208 of FIG. 2. The method can continue iteratively as further user input is received, e.g., return to block 302 or 304.

In one example using method 300, the predetermined aspect ratio is 1:1 (a square), the first threshold range (e.g., margin) is 0.09, and the second threshold range (e.g., margin) is 0.05. Thus, if the crop window of the first size had an aspect ratio substantially the same as the predetermined aspect ratio, and the crop window of the second size has an aspect ratio between 1:0.91 and 1:1.09, it falls within the first threshold range and the crop window stays at the first size having a 1:1 aspect ratio. However, if the crop window of the first size had an aspect ratio not substantially the same as the predetermined aspect ratio, and the crop window of the second size has an aspect ratio between 1:0.91 and 1:1.09, it would not fall within the required second threshold range of 1:095 to 1:1.05 and the crop window and would not be displayed at the predetermined 1:1 aspect ratio.

Figure 4A:
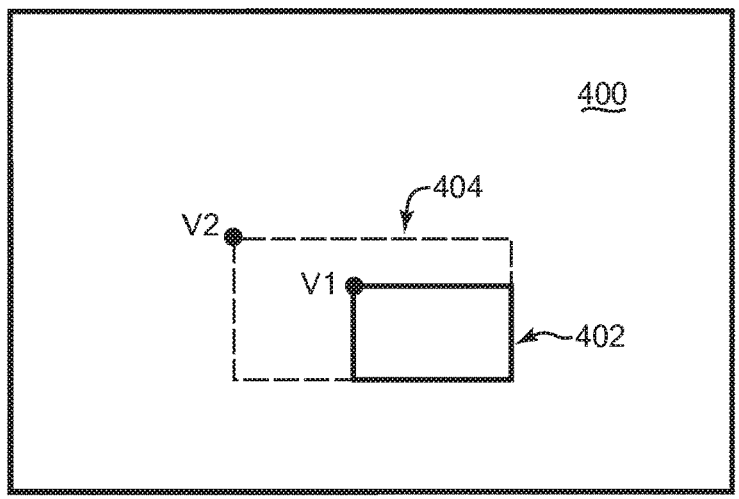
FIGS. 4A-4C are diagrammatic illustrations of example crop windows displayed based on example implementations of FIG. 2 or FIG. 3, according to some implementations.
Figure 4B:
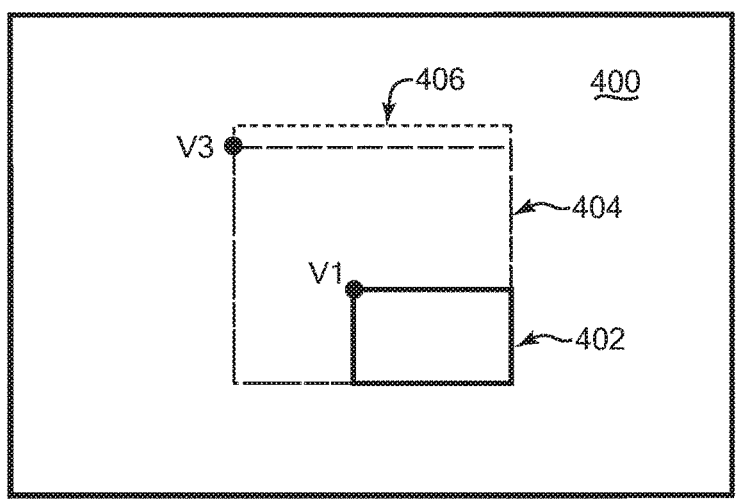
Figure 4C:
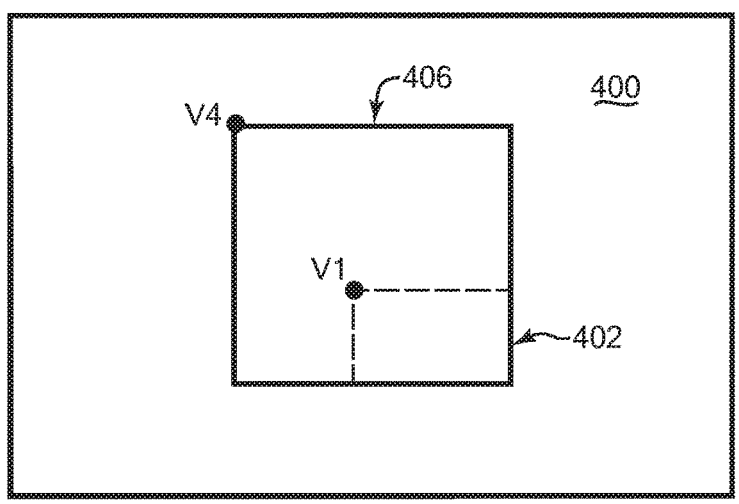

FIGS. 4A-4C are diagrammatic illustrations of example crop windows displayed based on example implementations of method 200 of FIG. 2 or method 300 of FIG. 3. In FIG. 4A, an image editing interface displays an image 400, and a crop window 402 is displayed within the boundaries of the image 400. The crop window 402 does not currently have an aspect ratio substantially the same as the predetermined aspect ratio, which in this example is 1:1.

User input is received from a user that selects a vertex of the crop window 402, which is at a position V1. For example, a user can select the vertex with a finger on a touchscreen (or by using a cursor controlled by a pointing device, etc.). The user moves the vertex to a position indicated by position V2. This causes the crop window to change in size to the new crop window 404. Crop window 404 can be displayed during or after the vertex movement, to indicate the crop window that will result from the current vertex position. For the position V2, the aspect ratio of the crop window 404 is not within a threshold range of the predetermined aspect ratio, so the crop window 404 is not resized by the system (e.g., not locked to aspect ratio of crop window 404) and follows the user input.

In FIG. 4B, the user input continues to move the vertex of the crop window to a position V3. At this position, the aspect ratio of the new crop window 404 has moved into the threshold range of the predetermined aspect ratio of 1:1 that is indicated as the crop window 406 in FIG. 4B (e.g., which may not be actually displayed at this stage). In FIG. 4C, the crop window 404 of FIG. 4B has been resized by the system to displayed crop window 406 having the predetermined aspect ratio (or having an aspect ratio substantially close to the predetermined aspect ratio). In this case, the corresponding vertex of the crop window is automatically moved to a position V4. In some implementations, the crop window 406 can be displayed with a different color, texture, dashed lines, or other indictor that indicates the crop window is within the predetermined aspect ratio threshold range and that the crop window has been snapped to the predetermined aspect ratio. Some implementations can continue to display previously-sized crop windows 402 and/or 404 to provide reference to current the crop window 406, e.g., for a limited period of time or until an event occurs (e.g., a user selection in the editing interface).

Figure 5A:
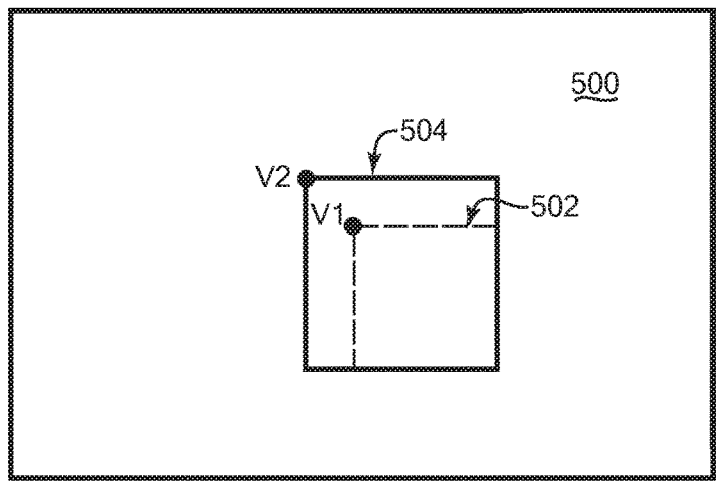
FIGS. 5A-5C are diagrammatic illustrations of example crop windows displayed based on additional example implementations of FIG. 2 or FIG. 3, according to some implementations.
Figure 5B:
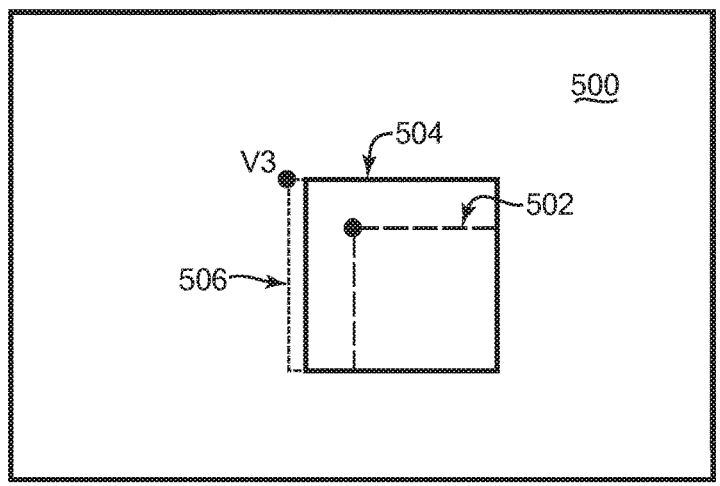
Figure 5C:
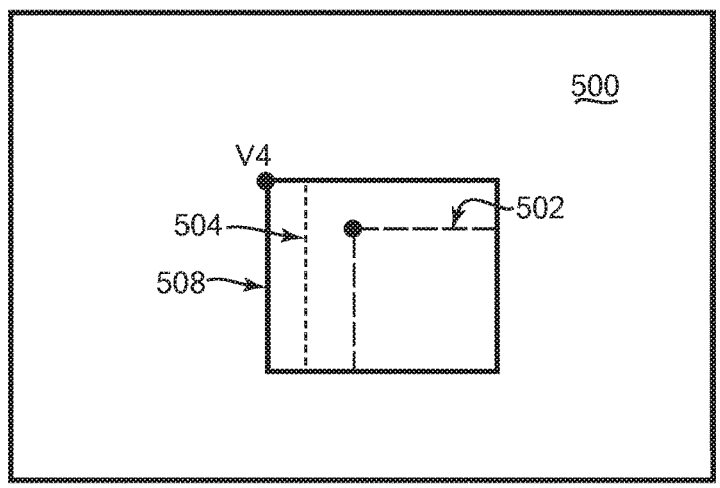

FIGS. 5A-5C are diagrammatic illustrations of example crop windows displayed based on example implementations of method 200 of FIG. 2 or method 300 of FIG. 3. In FIG. 5A, an image editing interface displays an image 500, and a crop window 502 is displayed within the boundaries of the image 500. The original crop window 502 has an aspect ratio substantially the same as the predetermined aspect ratio of 1:1, and thus can be considered already "snapped" or locked into the predetermined aspect ratio.

User input is received from a user that selects a vertex of the crop window 502, which is at a position V1. For example, a user can select the vertex with a finger on a touchscreen (or by using a cursor controlled by a pointing device, etc.). The user moves the vertex to a position indicated by position V2. This causes the crop window to change in size to the newly-sized crop window 504. Crop window 504 can be displayed during or after the vertex movement, to indicate to the user the crop window that will result from the current vertex position. For the position V2, the aspect ratio of the crop window 504 is not outside the threshold range of the predetermined aspect ratio, so the crop window 504 continues to be displayed at the predetermined aspect ratio of 1:1.

In FIG. 5B, the user input continues to move the vertex of the crop window to a position V3. At this position, the aspect ratio of the new crop window 506 has moved away from the predetermined 1:1 aspect ratio but is still within the threshold range of the predetermined aspect ratio. Thus, the system continues to display the crop window as crop window 504 in FIG. 5B at the predetermined aspect ratio. Crop window 506 is not displayed. In some implementations, an outline for crop window 506 can be displayed, e.g., while the user is moving the vertex, where the outline is visually distinguished from the actual crop window 504.

In FIG. 5C, the user input continues to move the vertex of the crop window to a position V4. At this position, the aspect ratio of the new crop window 508 is outside the threshold range of the predetermined aspect ratio. Therefore, the crop window has been resized by the system to displayed crop window 508 having the actual aspect ratio at vertex position V4. In some implementations, the crop window can be displayed with a different color, texture, dashed lines, or some other indictor that indicates when the crop window is within the predetermined aspect ratio threshold range and snapped to the predetermined aspect ratio, and when the crop window is outside the threshold range and not snapped to the predetermined aspect ratio.

Various other implementations can be used with the methods 200 and/or 300 (and/or other methods described herein). For example, instead of determining that the aspect ratio is within a threshold ratio range as described above, the method can check in other ways whether the crop window is within a threshold range of the predetermined aspect ratio. In some implementations, an angle between diagonals of the crop window can be calculated, or an angle between one of the diagonals and an edge of the crop window can be calculated. Such an angle can indicate the aspect ratio of the crop window, which can be compared to a threshold angle range to determine whether to snap to the predetermined aspect ratio.

In some implementations, if a 1:1 predetermined aspect ratio is being used, a different method can be used to detect whether the crop window has or is near to the predetermined aspect ratio. For example, an arithmetic mean (AM) can be determined as the width plus the height of the crop window, divided by two. Then it can be checked if both the width and the height of the crop window fall into a range defined from a value of AM*(1−margin) to a value of AM*(1+margin), where the margin is the desired threshold range similarly as described above.

In some implementations, one or more blocks of method 200 and/or method 300 can be performed in response to one or more conditions of the crop window and/or user manipulation of the crop window being met. In some examples, determining the current aspect ratio of the crop window, determining whether the current aspect ratio is within the threshold range, and/or resizing the crop window to a third size can be performed in response to a speed of the crop window modification going below a threshold speed (i.e., slowing down) based on the user input. For example, in some implementations, if the user input is expanding the crop window's size and/or aspect ratio at a fast pace above the threshold speed, then the method can omit resizing the crop window to a predetermined aspect ratio. In some implementations, the user may be likely to slow down crop window modification as the crop window approaches a desired size, and the aspect ratio determination and resizing to a third size can be performed at that slower speed.

In some additional examples, the aspect ratio determination and/or resizing of the crop window to the third size can be performed only if one or more dimension conditions and/or area conditions of the crop window of second size are met. For example, the aspect ratio determination and/or resizing of the crop window to the third size can be performed only if the crop window of second size has an area greater than a particular (e.g., predetermined) minimum area and/or if the second size has at least one dimension greater than a particular (e.g., predetermined) length.

In some implementations, an indication can be displayed that the crop window has been resized to the third size while the crop window has the aspect ratio within the threshold range of the predetermined aspect ratio. For example, while the user is dragging a vertex or a segment of the crop window, the crop window (or a portion thereof) can be displayed in a particular color indicating that the crop window is snapped to the predetermined aspect ratio. The indication can be a particular color, brightness, dashed line pattern, animation on the crop window, and/or other visual indication. For example, a crop window of second size can be displayed in yellow or white, and a crop window that has been resized to the third size can be displayed in blue. For example, the crop window can be highlighted so that the user has an indication that the crop window is in a snapped mode different from the normal freeform transformation mode in which the crop window has an aspect ratio more precisely in accordance with the user input. In some implementations, an indication separate from the crop window can be output, e.g., a message displayed to the side of the crop window or in some other area of a user interface or display. An audio indication (or force-feedback output) can be used in some implementations (e.g., beep when crossing into or out of threshold range).

In some implementations, the crop window of the third size can be displayed as a preview (e.g., suggested or proposed) crop window on the display, while maintaining the display of the crop window of the second size. For example, as a vertex or segment of the crop window is moved and the second size crop window is accordingly displayed in place of the first size crop window, a preview third size crop window can be displayed in a different color, with dashed outlines, and/or with other indicators distinguishing it from the second size crop window, e.g., in addition to or alongside the second size crop window. This preview crop window can be displayed before the resizing to the third size crop window is performed as described above. For example, the preview crop window can indicate to the user how the predetermined aspect ratio would appear in response to the second size crop window moving within the threshold range. An option can be provided to allow the user to instruct the second size crop window to conform to the predetermined aspect ratio.

In some implementations, display of the preview third size crop window can act as a prompt, informing the user that the crop window will be resized to the third size in response to appropriate user input. In some implementations, the method can additionally prompt the user for user input (e.g., by displaying a button or other prompt) after display of such a preview third size crop window. User input received in response to the display of the preview crop window (and/or additional prompt) can indicate whether to resize the crop window to the previewed third size (e.g., a confirmation or approval), or can indicate whether to cancel and remove from the display the preview crop window of the third size (e.g., a rejection). A removal of the preview crop window can leave the crop window of the second size displayed, for example. The user input can be in a variety of forms, e.g., the selection of an additional prompt, voice command(s), selection of the preview third size crop window (or second size crop window) via touchscreen or cursor, etc.

In some implementations, a preview third size crop window can be displayed in response to the crop window aspect ratio being within a preview threshold range different than the "resizing" threshold range(s) used for resizing the aspect ratio described above. For example, a preview threshold range can be larger than a resizing threshold range. In some examples, if the user resizes the crop window to an aspect ratio within the preview threshold range, a preview crop window of the third size is displayed (while maintaining the display of the crop window of the second size). If the user continues to resize the crop window to within the resizing threshold range, the crop window can be automatically resized to the third size and the crop window of the second size can be removed from the display.

Some implementations can provide multiple different predetermined aspect ratios for which the method can check. The aspect ratio of the crop window can be snapped to a particular one of the predetermined aspect ratios associated with a threshold range within which the aspect ratio of crop window currently falls. For example, two predetermined aspect ratios can be used, e.g., a 1:1 aspect ratio and a 3:2 aspect ratio. If the second size crop window is detected to have an aspect ratio within a threshold range of the first predetermined aspect ratio, the third size crop window is sized to have an aspect ratio substantially the same as the first predetermined aspect ratio. If the second size crop window has an aspect ratio within a threshold range of the second predetermined threshold, the third size crop window is sized to have an aspect ratio substantially the same as the second predetermined aspect ratio. In some implementations, each predetermined aspect ratio can be associated with a different indication that is displayed (or otherwise output to the user from the device) if the associated predetermined aspect ratio is active for the crop window. For example, different colors of the displayed crop windows, different dashed outlines of the crop windows, or other indicators can be used for the different predetermined aspect ratios. Some implementations can provide a subset of the used predetermined aspect ratios to cause automatic resizing of the crop window without additional user input (e.g., the most commonly used aspect ratio(s) as determined from stored user history indicating previous aspect ratios selected by the user), and/or some predetermined aspect ratios can require user confirmation or other input before the crop window is resized to those aspect ratios.

Figure 6:
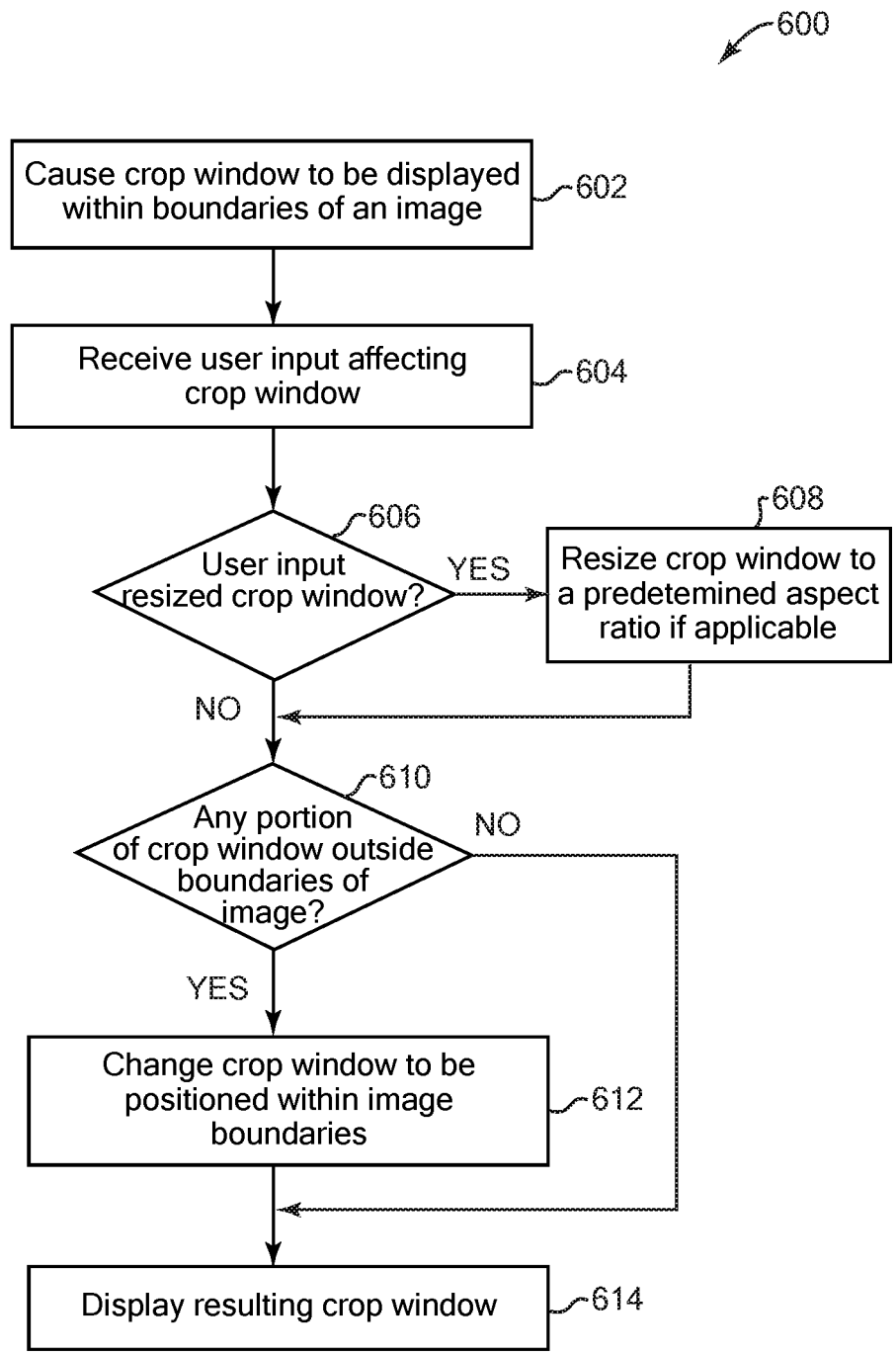
FIG. 6 is a flow diagram illustrating another example of a method to assist cropping of an images, according to some implementations.

FIG. 6 is a flow diagram illustrating another example 600 of a method to assist cropping of an image. Method 600 can be implemented by system(s) similarly as described above for methods 200 and 300. In this example, method 600 can include features providing resizing of a crop window to a predetermined aspect ratio and/or changing of a crop window to be positioned within boundaries of an image.

In block 602, a crop window (e.g., of a first size) is caused to be displayed over a displayed image within the boundaries of the image. For example, similarly as described above with respect to FIG. 2, the image and the crop window can be displayed in an image editing user interface displayed by a device and manipulable by user input.

In block 604, user input affecting the crop window is received. For example, the user input can change one or more characteristics of a crop window, such as changing the crop window to a different size (e.g., resizing). Such changes may include changing to a different shape and/or different scale. In another example, the user input can move the crop window relative to the image. For example, one type of movement is translation (e.g., shifting or sliding) of the crop window from one position to another position within the displayed interface relative to the image, or translation of the image with respect to the crop window. Another type of movement is relative rotation between the image and the crop window. Herein, this relative rotation can include rotating the image with respect to the crop window, allowing the crop window to retain its orientation in the interface. In other examples, the crop window may rotate and allow the image to retain its orientation in the interface. The user input causes (e.g., instructs) the crop window to be of a second size, e.g., as a user-modified crop window.

In block 606, it is checked whether the user input resized the crop window. If so, the method continues to block 608, in which the method resizes the crop window to a predetermined aspect ratio, if applicable. For example, method 200 of FIG. 2 or method 300 of FIG. 3 can be used to resize the crop window if the second size crop window is within a threshold range of a predetermined aspect ratio, thus providing a crop window of third size. In some implementations, the method also stores the aspect ratio of the original (first size) crop window, which may be needed in other blocks of method 600.

After block 608, or if the user input does not resize the crop window as checked in block 606, the method continues to block 610. In block 610, it is checked whether any portion(s) of the crop window are positioned outside one or more boundaries of the image based on the user input. For example, the user input may have caused a resizing of the crop window that moved one or more vertices and/or segments of the crop window outside the image boundaries. In another example, the user input may have caused a relative movement (e.g., rotation and/or translation) between crop window and image that moved one or more vertices and/or segments of the crop window outside the image boundaries. In some implementations, user input may have caused both resizing of the crop window and a relative movement between crop window and image, for example. In some implementations, block 610 can check whether the crop window of third size resulting from block 608 is outside the image boundaries. Other implementations can check whether the crop window of second size resulting from the user input is outside the image boundaries. If no portion of the crop window is positioned outside one or more boundaries of the image, the method continues to block 614, described below.

If one or more portions of the crop window are positioned outside one or more boundaries of the image, the method continues to block 612, in which the crop window is changed to be positioned within the image boundaries, e.g., repositions and (in some cases) resizes the crop window. Some examples of such changes are described above with reference to FIG. 5. In some implementations, the changed crop window is located as closely as possible to its position and size outside the image boundaries. In some implementations or cases, the changed crop window resulting from block 612 can be a crop window of a fourth size, different than the crop window of third size provided by block 608 (if block 608 was performed). In some implementations, the changed crop window resulting from block 612 can be considered to be a crop window of a third size, where the third size can include the aspect ratio resizing of block 608 (if that block was performed) as well as the changes to the crop window by block 612.

In block 614, display of a resulting crop window is caused in the image editing interface. In some implementations, if blocks 608 and 612 were performed, the resized crop window resulting from block 608 was not displayed, and the final crop window resulting from both aspect ratio resizing (from block 608) and boundary positioning (from block 612) can be displayed after performing those blocks. If only block 608 was performed, or only block 612 was performed, the appropriate resulting crop window from that block can be displayed in block 614. After block 614, the method can end or return to a previous block (e.g., block 604 if further user input is received).

The order of blocks in method 600 can be changed to a different order in other implementations, and/or two or more of the blocks can be performed partially or completely simultaneously. For example, the method can check for crop window portions outside image boundaries in block 610 and change the crop window in block 612, followed by resizing the crop window in block 608.

Figure 7:
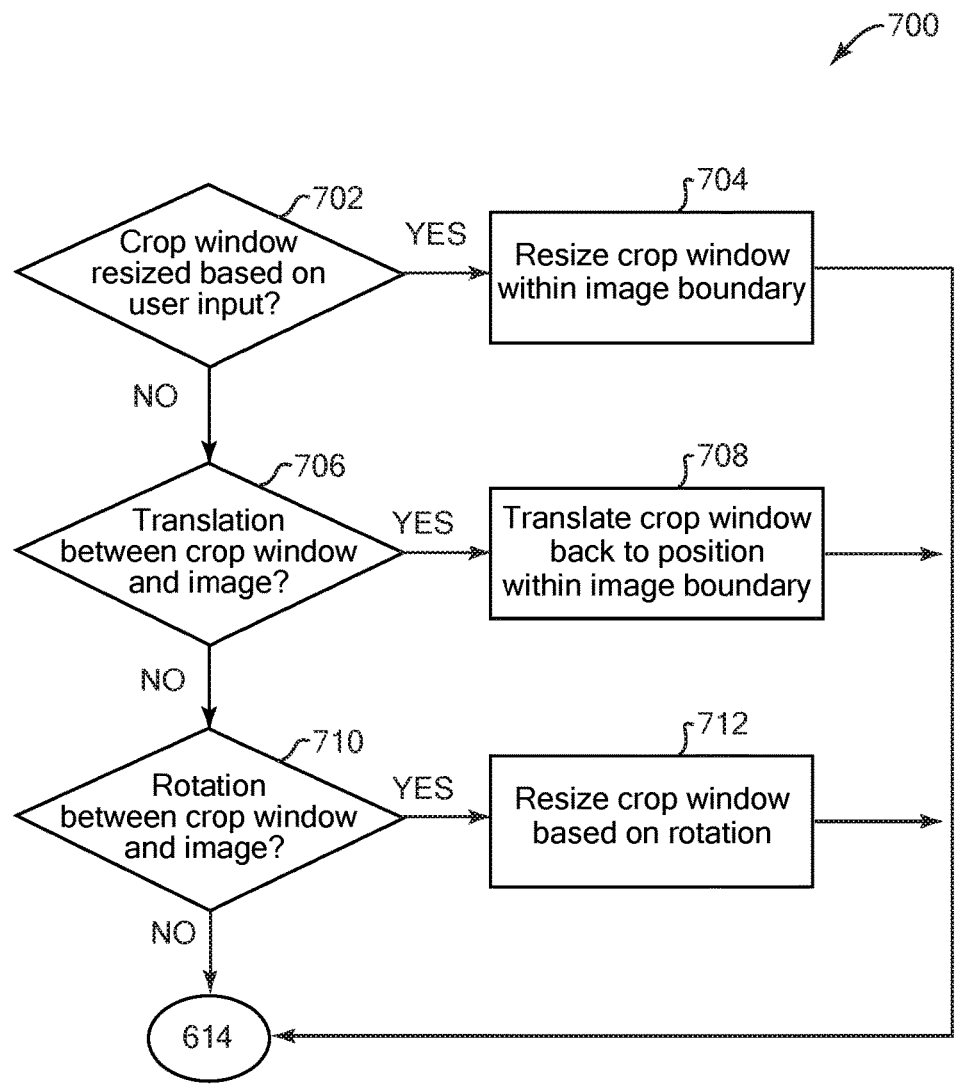
FIG. 7 is a flow diagram illustrating an example method implementing a block of FIG. 6 in which the crop window is changed to fit within image boundaries, according to some implementations.

FIG. 7 is a flow diagram illustrating an example method 700 implementing block 612 of FIG. 6, in which the crop window is changed to fit within the image boundaries. The blocks of method 700 described below can be performed or processed in any order, or partially/completely simultaneously.

In block 702, it is checked whether the crop window was resized based on the user input. For example, the resizing can be similar to the resizing described above with reference to FIGS. 2 and 3, based on a user moving a vertex or segment of the crop window within the user interface. In this case, the resizing may cause one or more portions of the crop window to move outside the image boundaries. If a resizing has been performed, the method continues to block 704 in which the crop window is resized to be positioned within the image boundaries. Some example implementations of this block are described in greater detail below with respect to FIG. 8. The method then can return to block 614 of FIG. 6, for example.

In block 706, it is checked whether translation between the crop window and the image occurred based on the user input. For example, the user may have dragged the entire crop window across the image (e.g., using a drag operation) and the image editing interface without resizing the crop window, such that one or more portions of the crop window are positioned outside the image boundaries. In some implementations or cases, the user input may have caused the image to be translated relative to the crop window.

If translation occurred, the method continues to block 708, in which the crop window is moved to a position within the image boundaries, e.g., based on the vertex of the crop window that is furthest from the image boundary. For example, the furthest vertex can be translated back to the closest point inside the image boundary, and the same vector of translation can be applied to all the other vertices of the crop window to determine the new position of the crop window within the image boundaries. Since the original crop window fit inside the image boundaries and was not resized by the move operation, the new crop window moved by block 708 will continue to fit inside the image boundaries. In some implementations, the crop window can be transferred to the coordinate system of the image rectangle, e.g., as defined by left and bottom edges of a display area, to find the furthest vertex. The method can then return to block 614 of FIG. 6, for example. In some implementations, the crop window can be temporarily displayed outside the image boundaries when moved to a position as directed by the user, and then (e.g., after the user finishes the translate operation) the system can animate a motion of the crop window to a position back inside the image boundaries.

In block 710, it is checked whether relative rotation occurred between the crop window and the image based on the user input. For example, the user input may have rotated the image relative to the crop window, or rotated the crop window relative to the image. In various implementations, user input causing such rotation can be provided by selecting a portion of the image or crop window and moving a pointer (e.g., finger on touchscreen, cursor controlled by pointing device, etc.) to rotate the image or crop window. In some implementations, the rotation can be caused by user input such as commands (voice, text, menu, etc.), input in interface fields, etc.

If rotation has occurred, then the method continues to block 712 in which the crop window is resized to be positioned within the image boundaries based on the rotation. Some example implementations of this block are described in greater detail below with respect to FIG. 11. The method then can return to block 614 of FIG. 6, for example.

In some implementations, multiple blocks 704, 708, and/or 712 can be performed in method 700. For example, user input may have caused movement of the crop window, resizing of the crop window, and/or relative rotation of crop window and image (e.g., two of these three, or all three), thus leading to the corresponding blocks 704, 708, and/or 712 to be performed.

In some implementations, resizing of block 704 or block 712 can include or result in a translation of the crop window so that all vertices of the original crop window are in different locations for the new crop window, e.g., as in the example of FIG. 10 described below. For example, this can occur if the new crop window has been translated as well as resized or rotated. In some examples, user input command(s) can cause both resizing and translation of the crop window, both rotation and translation of the crop window, and/or all three of resizing, rotation, and translation.

Figure 8:
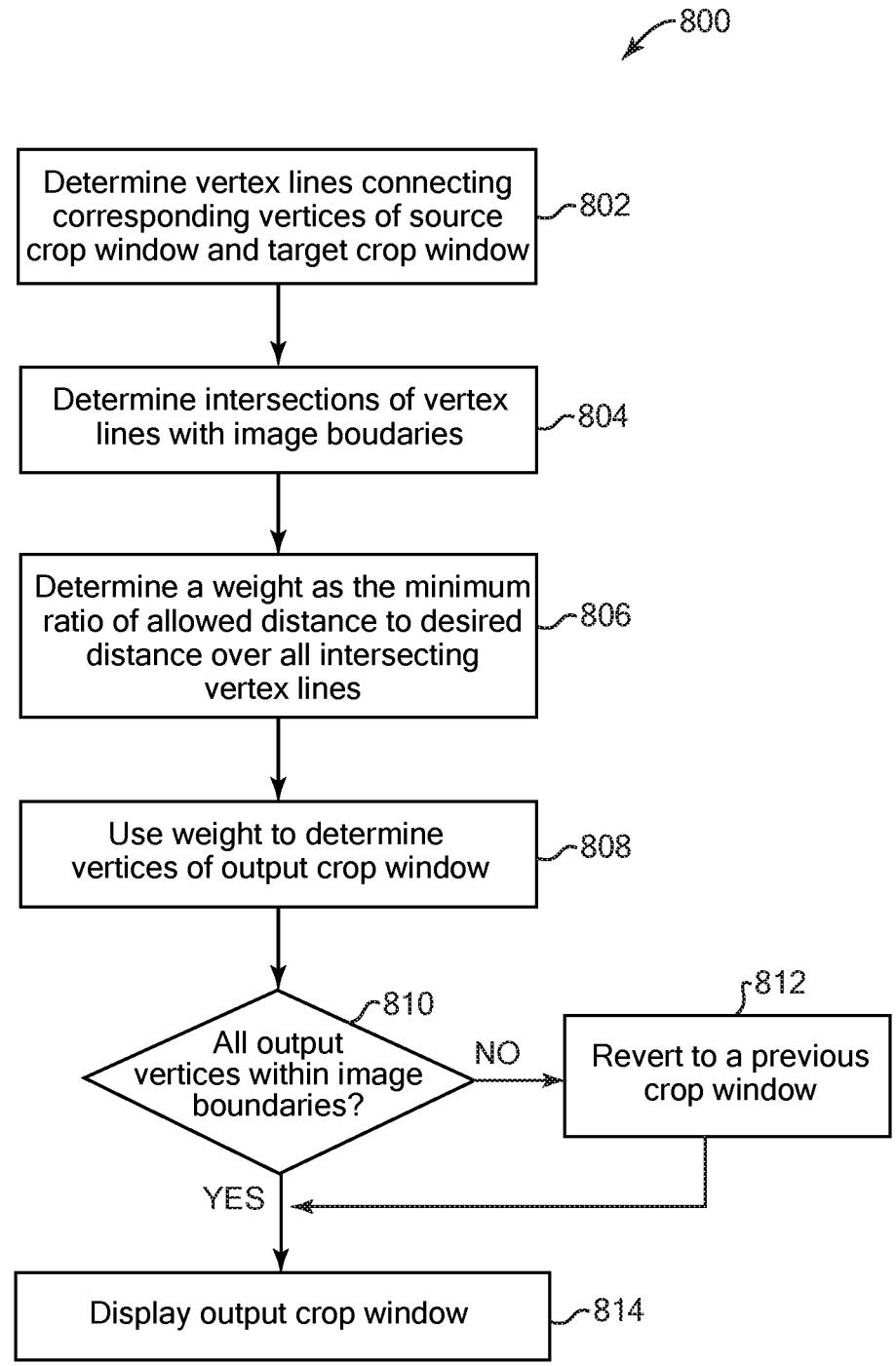
FIG. 8 is a flow diagram illustrating an example method implementing a block of FIG. 7 in which the crop window is resized to fit within image boundaries, according to some implementations.

FIG. 8 is a flow diagram illustrating an example method 800 that can be used to implement block 704 of FIG. 7, in which the crop window is resized to fit within the image boundaries. In this example method, the crop window was previously determined to have been resized based on user input so that one or more portions of the crop window are positioned outside one or more image boundaries. For example, the user may have moved a vertex of the crop window outside an image boundary, causing a corresponding change (e.g., increase) in the size (e.g., scale and/or shape) of the crop window, and/or the user may have moved a segment of the crop window outside an image boundary. In the examples below, the original crop window is referred to as the source crop window, the user-resized crop window is referred to as the target crop window, and the crop window resulting from the method 800 is referred to as the output crop window.

Figure 9A:
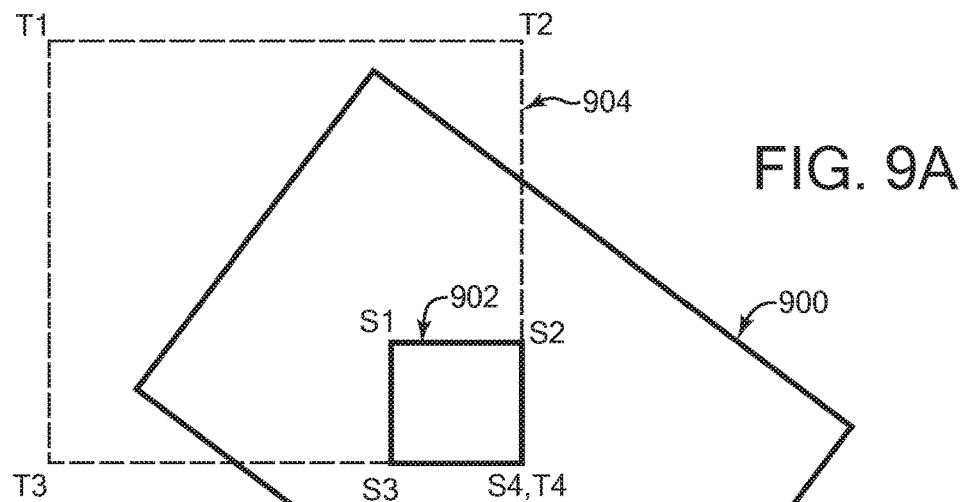
FIGS. 9A-9C are diagrammatic illustrations of example implementations of blocks of FIG. 8, according to some implementations.
Figure 9B:
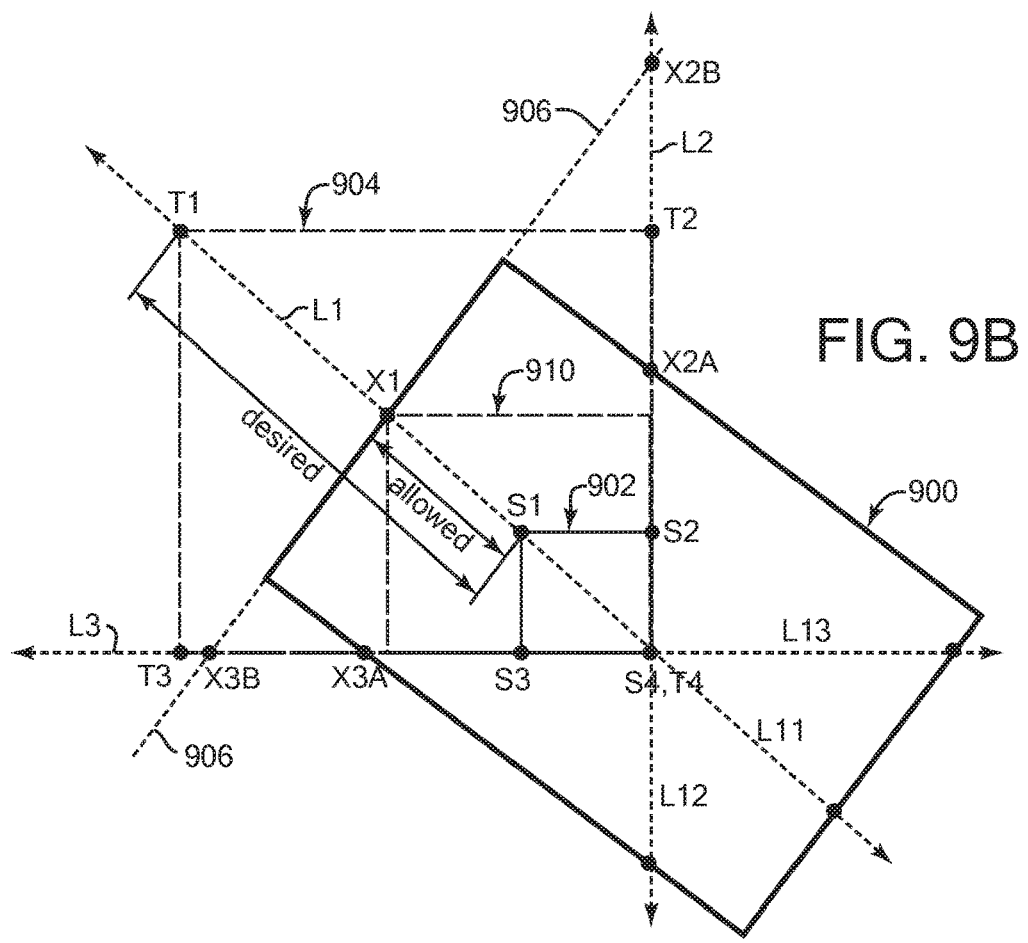
Figure 9C:
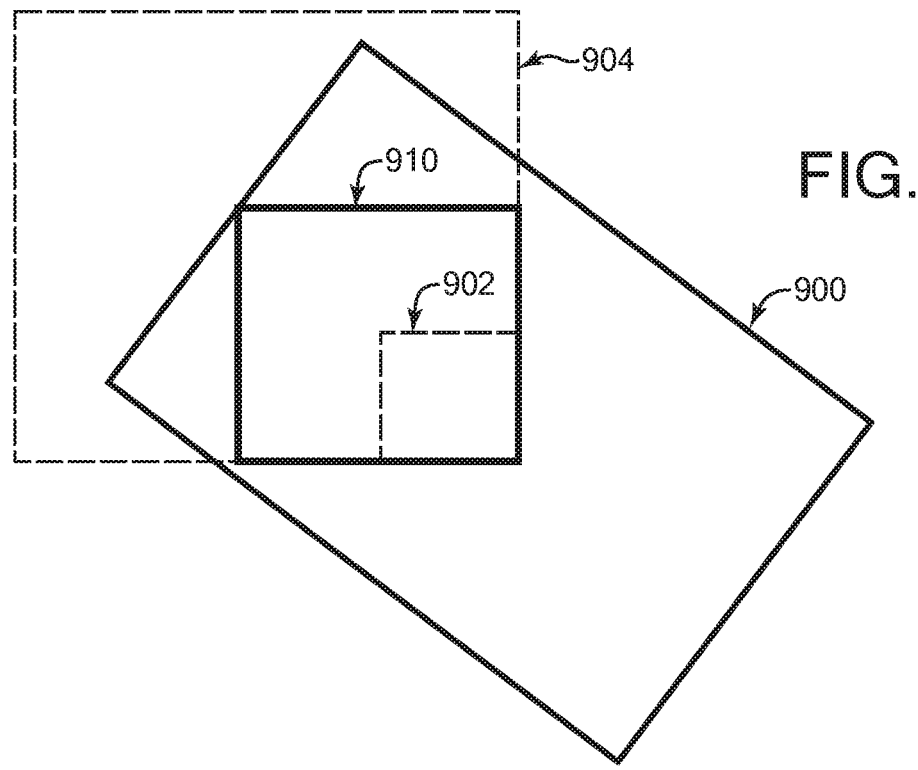

One example illustrating blocks of FIG. 8 is shown in the diagrammatic illustrations of FIGS. 9A-9C. FIG. 9A illustrates a displayed image 900 that has been previously rotated. A source crop window 902 is displayed within the boundaries of the image 900 and has vertices S1, S2, S3, and S4. In this example, user input has caused a vertex S1 to be moved to a position indicated by vertex T1, which is outside an image boundary. The repositioning of vertex T1 causes the other portions of the crop window to also be scaled, so that a target crop window 904 has vertices T1, T2, T3, and T4.

Referring to FIG. 8, in block 802, vertex lines connecting corresponding vertices of the source crop window and the target crop window are determined. Referring to the example of FIG. 9B, this block causes the system to determine vertex line L1 connecting vertices S1 and T1, vertex line L2 connecting vertices S2 and T2, and vertex line L3 connecting vertices S3 and T3. The vertex lines L1-L3 can also be known as vectors or rays, since they extend in one direction. Some of the vertex lines may be ignored. For example, a vertex line connecting vertices S4 and T4 does not exist and can be ignored because these vertices overlap. Also, vertex lines (e.g., rays) that intersect boundary lines but extend from the source vertex in the opposite direction of the target vertex can be ignored, such as vertex lines L11, L12, and L13 in FIG. 9B.

In block 804, intersections of the vertex lines with the image boundaries are determined. In some implementations, intersections are found between the vertex lines and boundary lines that include the boundaries of the image, e.g., the boundary lines can be considered to extend beyond the corners of the image for the purpose of finding the intersections. For example, referring to FIG. 9B, the method finds intersection point X1 for line L1, intersection points X2A and X2B for line L2, and intersection points X3A and X3B for line L3. Intersection points X2B and X3B are intersections with boundary lines 906 extending from an image boundary.

In some implementations, vertex lines are extended in directions from each vertex of the source crop window in block 802, to provide up to sixteen total intersection points with the boundary lines that include image boundaries. For example, if the source crop window has vertices ABCD and the target crop window has corresponding vertices EFGH, then four vertex lines are considered: L1 containing vertices A and E, L2 containing vertices B and F, L3 containing vertices C and G, and L4 containing vertices D and H. Then the intersection points of these four vertex lines L1, L2, L3, L4 with four lines containing edges of the image are examined, which can be up to 16 intersection points. Each vertex line (e.g., ray) from a source vertex to an intersection point that does not contain a target vertex (e.g., pointing from a source vertex in a direction opposite to the target crop window) can be ignored.

In block 806, a weight is determined as the minimum ratio of allowed distance to desired distance over the intersecting vertex lines. This block finds the closest intersection of vertex line and boundary line to the source vertex through which that vertex line extends. For example, the desired distance is the distance from a source crop vertex to the corresponding target crop vertex on the vertex line extending between these vertices, and the allowed distance is a "ray" as described above, e.g., the distance from the source crop vertex to the intersection with the image boundary line on that same vertex line (e.g., the closest intersection, if there are more than one intersection on that vertex line). The minimum ratio is the smallest ratio of the ratios of allowed distance to desired distance. For example, a ratio of allowed distance divided by the desired distance is determined for each vertex line, and the smallest of these ratios is selected as the minimum ratio and the weight.

For example, FIG. 9B shows that the intersection X1 was found to have the minimum ratio of allowed distance to desired distance along its vertex line, among all of the ratios determined for the vertex lines L1-L3. In the case of intersection X1, the ratio was for distance allowed divided by distance desired, and this is the determined weight.

In block 808, the weight is used to determine output vertices of an output crop window that is to be displayed as the result of method 800. For example, the weight can be used to scale the amount of distance that each vertex of the source crop window is to be moved along its associated line extending to the corresponding vertex of the target crop window. In some examples, the weight can be multiplied by the distance between source vertex and corresponding target vertex. In some examples, the weight can range from 0.0 to 1.0, where a weight of 1.0 causes the output vertex to be the same as the corresponding target vertex, and a weight of 0.0 causes the output vertex to be the same as the corresponding source vertex.

In block 810, it can be checked whether all output vertices are within the boundaries of the image. For example, in some cases or implementations, there may be edge cases where the above blocks do not detect precisely the location of a target crop window (e.g., due to floating point number error or other errors), and one or more output vertices may be outside the image boundaries. If all output vertices are within the image boundaries, the method continues to block 814 to display the output crop window in place of the source crop window.

FIG. 9C shows an example of an output crop window 910 determined from the source crop window 902 and target crop window 904 of FIGS. 9A-9B.

If not all output vertices are within the image boundaries as checked in block 810, then in block 812 the output crop window is reverted to a previous crop window positioned within the boundaries, e.g., reverts to the source crop window. The method then continues to block 814 to display the output crop window.

Figure 10:
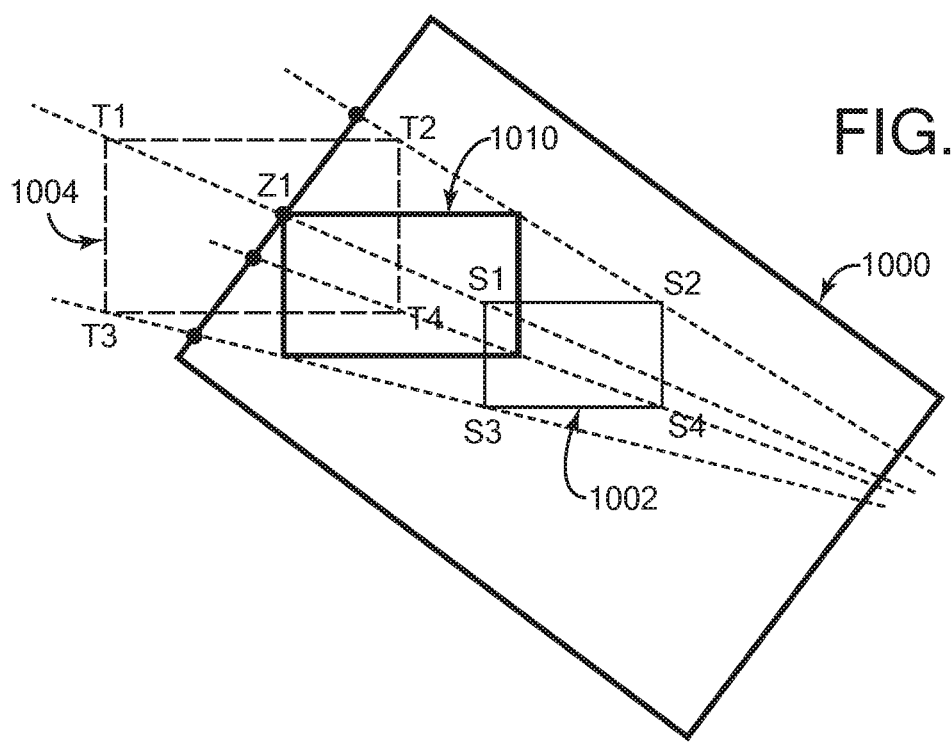
FIG. 10 is a diagrammatic illustration of another example according to FIG. 8, according to some implementations.

FIG. 10 is a diagrammatic illustration of another example using the method 800 of FIG. 8. In this example, a source target crop window 1002 is positioned within boundaries of image 1000. A target crop window 1004 is increased in scale as well as shifted in position (e.g., based on one or more user commands). After relevant vertex lines have been connected between corresponding vertices of source crop window 1002 and target crop window 1004 (shown as dashed lines), the intersection point Z1 is found based on the minimum ratio of allowed distance to desired distance. A weight is determined based on intersection point Z1 and the weight determines the output vertices on each vertex line, resulting in an output crop window 1010 that fits within the image boundaries.

In some implementations, the target crop window is removed from display in the editing interface on the display (e.g., after the user finishes a resizing/moving operation). In other implementations, the target crop window can be temporarily displayed (e.g., part of the target window or the complete target window), e.g., before the resized crop window is displayed to fit within the image boundaries. For example, if the user drags (or otherwise resizes) a vertex or segment of the crop window to be positioned outside an image boundary, the resulting target crop window can be displayed outside the image boundaries. Once the user finishes the dragging (or other resizing) operation, the crop window can be animated (e.g., intermediate sizes displayed) to scale down to a size fitting within the image boundaries as the output crop window.

Although the crop windows described above are rectangular windows, method 800 can also be performed with other crop windows, e.g., polygonal crop windows with 5 vertices, image border including 10 vertices, etc.

In some implementations, the block 608 of FIG. 6 can be used to change the aspect ratio of the crop window to a predetermined aspect ratio before method 800 is used to resize the crop window to be positioned within image boundaries. Some examples can change the aspect ratio of both source crop window and target crop window. In some implementations, a stored original aspect ratio of the source crop window (before any changing to a predetermined aspect ratio was performed) can be accessed and used to revert the crop window to that aspect ratio if the resizing of block 608 or method 800 does not produce a satisfactory target crop window.

In some implementations, the user interface can constrain a change in the size of the crop window to a predetermined maximum size (and/or display the constrained area in the editing interface). For example, a vertex of the crop window moved by the user can be constrained to a bounding box (e.g., rectangle) that includes the entire border of the image, so that resizing the crop window in response to the user input is restricted to no greater than the bounding box. In some cases, this feature may make it easier for the user to constrain a resizing of the crop window to a size that maintains the crop window within the boundaries of the image.

In some implementations, resizing features described in method 800 for positioning or maintaining a crop window within the boundaries of the image may confuse the user who is trying to resize the crop window. For example, if the crop window touches or is very close to a boundary of the image and the user tries to scale the crop window by moving a vertex of the crop window outside the boundary, the method may forbid this operation in order to maintain the crop window inside the image boundaries. In some implementations, to reduce possible user confusion, the method can reduce the size of the displayed crop window to allow the user to increase its size up to the image boundaries. For example, if the user tries to scale up a crop window positioned at or close to (e.g., within a threshold distance of) an image boundary, the method creates a small crop window and displays it centered on the same location as the original crop window. This small crop window can be displayed to scale up in size in response to the user increasing the scale, e.g., by dragging a vertex of the crop window. The method 800 can be used with the small crop window as the source crop window being scaled to a target crop window instructed by the user, and display a resulting output crop window within the image boundaries.

In some implementations, the resizing method 800 of FIG. 8 can be implemented in other ways. For example, an example implementation can provide successively more accurate estimations or guesses as to the size of the crop window that fits within image boundaries, e.g., instead of (or in addition to) using lines with intersections as described above. In one example, the system can make a guess at a fitting size and/or position between corresponding vertices of the source crop window and the target crop window, and check if the guessed crop window fits within the image boundaries, e.g., within a predetermined threshold distance of the boundary. If the guess is too far (e.g., outside a boundary) or not far enough (e.g., within boundaries but not close enough to the boundary), the system can continue to make more refined guesses in the appropriate direction(s) based on the previous guesses, until the largest fitted size for the crop window is found.

Figure 11:
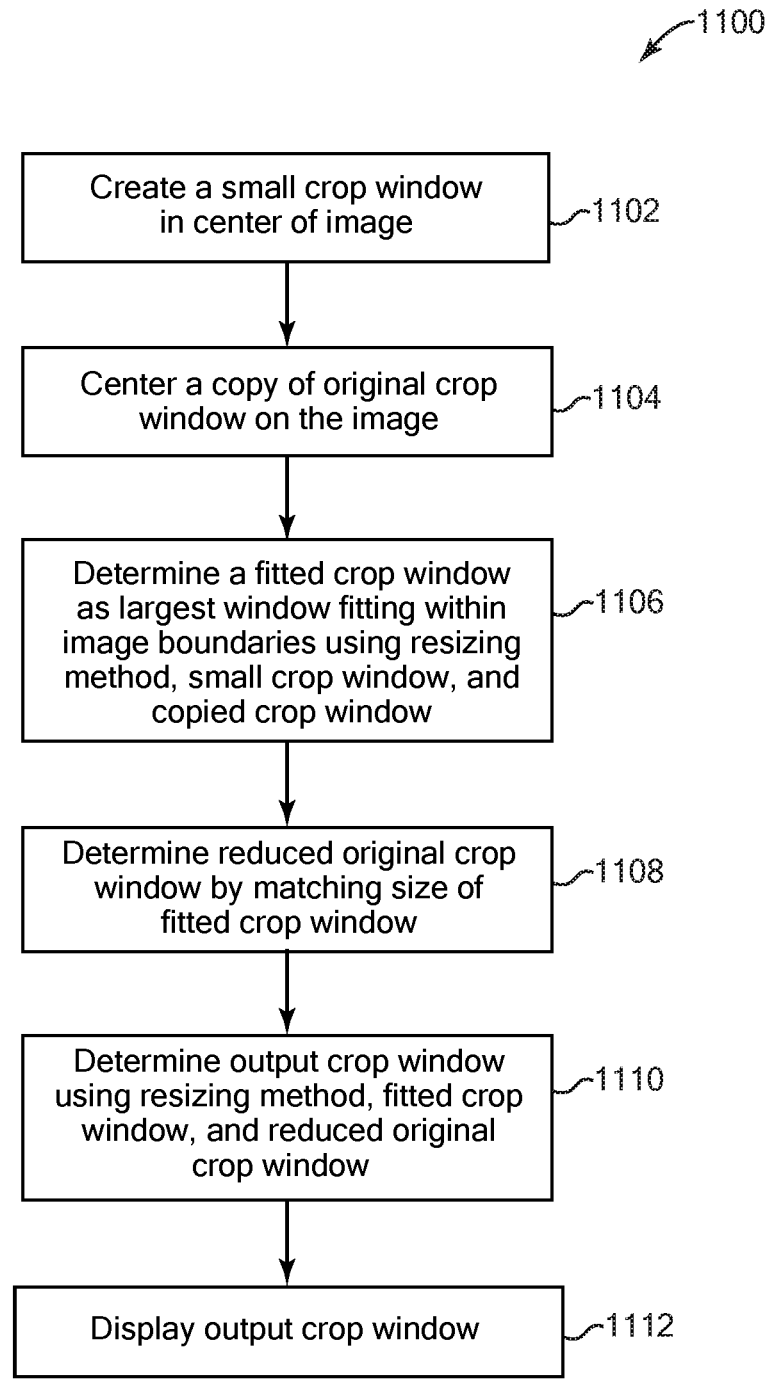
FIG. 11 is a flow diagram illustrating an example method implementing a block of FIG. 7 in which the crop window is resized to fit within image boundaries based on image rotation, according to some implementations.

FIG. 11 is a flow diagram illustrating an example method 1100 that can be used to implement block 712 of FIG. 7, in which the crop window is resized to fit within the image boundaries based on rotation of the image. In this example method, the image was previously determined to have been rotated relative to the crop window. Such determination is based on user input such that one or more portions of the crop window are positioned outside one or more image boundaries. For example, the user may have rotated the image with respect to the crop window and the editing interface, or rotated the crop window with respect to the image and editing interface.

In the examples below, the crop window that has been changed by user input to be outside one or more boundaries is referred to as the original crop window and the crop window resulting from the method 1100 is referred to as the output crop window.

In block 1102, a small crop window is determined that is positioned on the center of the image. The small crop window is a reduced-size version of the original crop window and has the same aspect ratio as the original crop window.

In block 1104, a copy of the original crop window is centered on the image (a "copied crop window"). The copied crop window and the small crop window are both centered at the same position.

In block 1106, a fitted crop window is determined as the largest window fitting within the image boundaries at the center position of the image based on the small and copied crop windows. For example, the fitted crop window can be determined using the resizing method 600 of FIG. 6. The resizing method 600 can use the small crop window as the source crop window and use the copied crop window as the target crop window, to determine the fitted crop window fitting within the image boundaries.

In block 1108, a reduced original crop window is determined by reducing the size of the original crop window to match the size of the fitted crop window. The fitted crop window is a scaled-down version of the original crop window at the centered position, and the original crop window is reduced in size at its original position to match the fitted crop window. This reduced-size original crop window does not necessarily fit within the image boundaries at its present position.

In block 1110, an output crop window is determined that fits within the image boundaries. For example, the resizing method 600 of FIG. 6 can be used to determine the output crop window. The resizing method 600 can use the fitted crop window as the source crop window and the reduced original crop window as the target crop window, to determine the output crop window fitting within the image boundaries. In block 1112, a display of the output crop window is caused.

In some cases, if the original crop window is small, it need only be moved with respect to the image (e.g., translated) and does not need to be reduced in size to fit within the image boundaries of the rotated image. In some implementations, if the method detects such a small crop window compared to image area in its current orientation, the crop window can be translated into the image boundaries similarly as in block 706 of FIG. 7. For example, the furthest vertex of the crop window can be moved back to the closest point inside the image boundary, and apply the same vector of movement to the other vertices of the crop window.

Figure 12A:
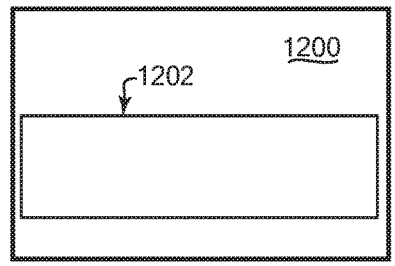
FIGS. 12A-12F are diagrammatic illustrations of examples of the use of the method of FIG. 11 to reposition a crop window for display.
Figure 12D:
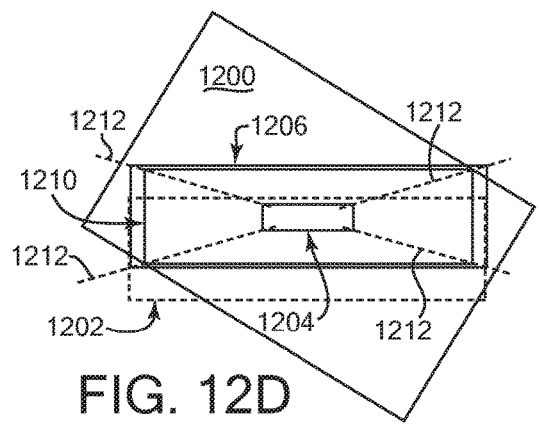
Figure 12B:
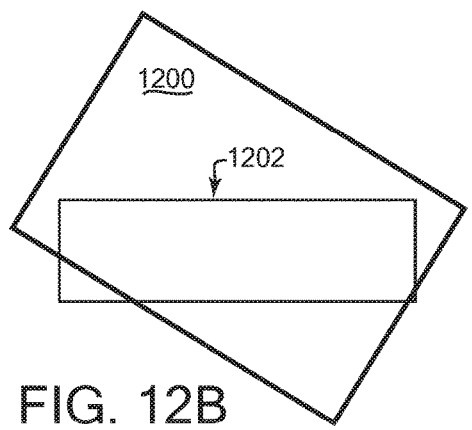

FIGS. 12A-12F are diagrammatic illustrations of some examples of the use of method 1100 to reposition a crop window for display within image boundaries after relative rotation between image and crop window. In FIG. 12A, an image 1200 is displayed in an image editing user interface, and an original crop window 1202 is displayed within the boundaries of image 1200. In FIG. 12B, the image has been rotated based on user input such that the original crop window 1202 is now positioned partially outside the boundaries of image 1200.

Figure 12E:
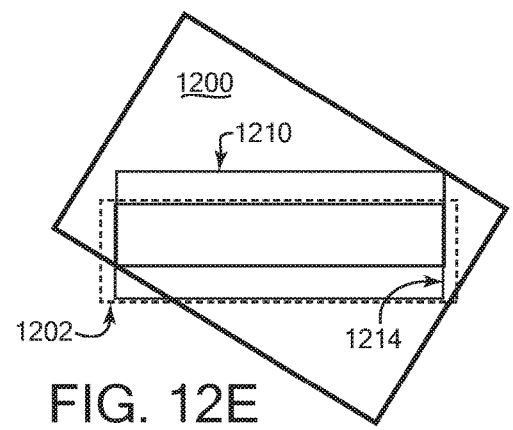
Figure 12C:
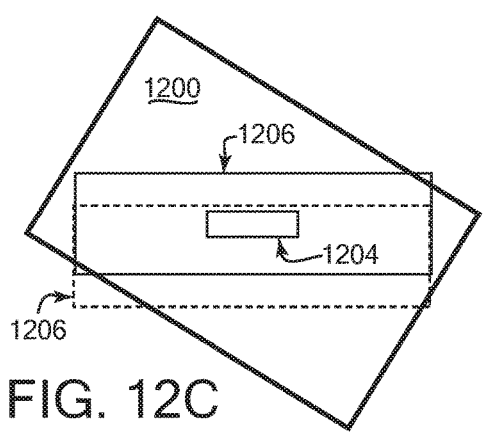

In FIG. 12C, a small crop window 1204 is determined, where the window is centered at the center of image 1200 (e.g., block 1102). In addition, a copied window 1206 is provided at the center of image 1200 (e.g., block 1104). The original crop window 1202 is shown in dashed lines.

In FIG. 12D, a fitted crop window 1210 is determined using the resizing method of FIG. 11 (e.g., block 1106), with the small crop window 1204 as a source crop window and the copied crop window 1206 as a target crop window. For example, vertex lines 1212 are used to determine the closest intersection with image boundaries and determine a weight for providing the vertices of the fitted crop window 1210.

In FIG. 12E, a reduced original crop window 1214 is determined (e.g., block 1108) by resizing the original crop window 1202 to match the fitted crop window 1210.

Figure 12F:
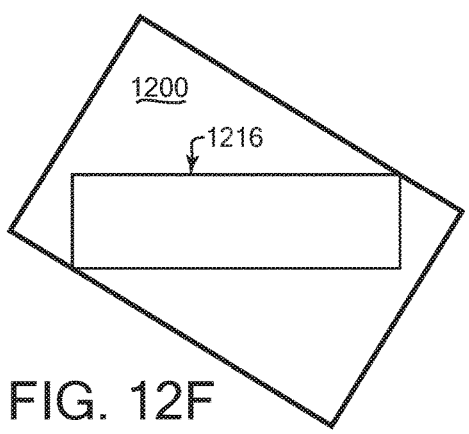

In FIG. 12F, an output crop window 1216 is determined and displayed (e.g., blocks 1110 and 1112) by using the resizing method of FIG. 11, with the fitted crop window 1210 as a source crop window and the reduced original crop window 1214 as a target crop window. For example, vertex lines (not shown) are used to determine the closest intersection with image boundaries and determine a weight for providing the vertices of the output crop window 1216. In this case, since the fitted crop window was the source and already contacts the image boundary, the determined weight is zero such that the fitted (source) crop window 1210 is the output crop window 1216.

Figure 13A:
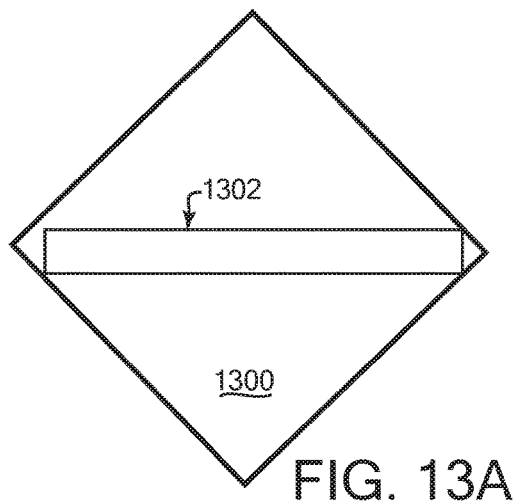
FIGS. 13A-13E are diagrammatic illustrations of additional examples of the use of the method of FIG. 11 to reposition a crop window for display.
Figure 13D:
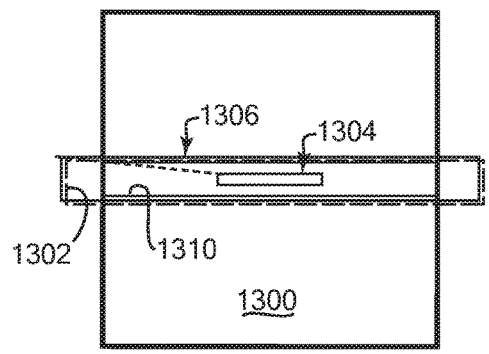
Figure 13B:
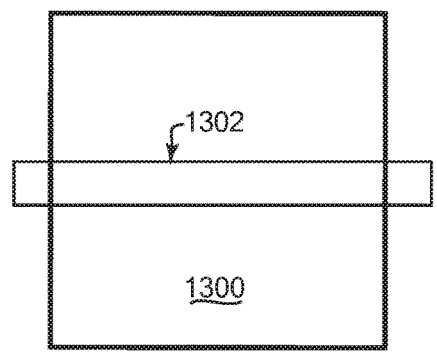
Figure 13E:
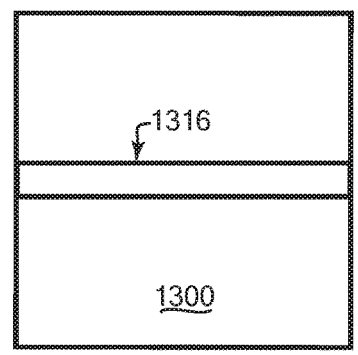
Figure 13C:
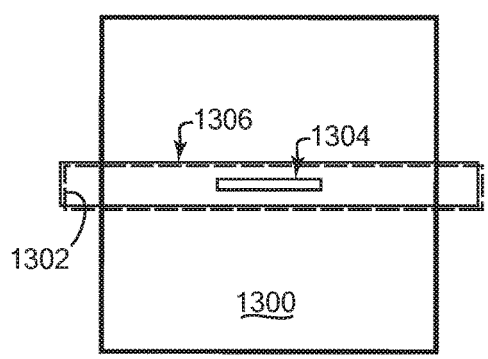

FIGS. 13A-13E are diagrammatic illustrations of additional examples of the use of method 1100 to reposition a crop window for display within image boundaries after relative rotation between image and crop window. In FIG. 13A, an image 1300 is displayed in an image editing user interface, and an original crop window 1302 is displayed within the boundaries of image 1300. In FIG. 13B, the image has been rotated based on user input such that the original crop window has become partially positioned outside the boundaries of image 1300. In FIG. 13C, a small crop window 1304 that is centered at the center of image 1300 and a copied crop window 1306 at the center of image 1300 are determined, where the copied crop window 1306 is the same as original crop window 1302 and centered on the image. The original crop window 1302 is shown in dashed lines.

In FIG. 13D, a fitted crop window 1310 is determined using the resizing method of FIG. 11, with the small crop window 1304 as a source crop window and the copied crop window 1306 as a target crop window. A reduced original crop window (not shown) is determined to match the fitted crop window 1310 and determine an output crop window by using the resizing method of FIG. 11, with the fitted crop window 1310 as a source crop window and the reduced original crop window as a target crop window. In this case, the fitted (source) crop window is already contacting the image boundary, such that the fitted crop window 1310 is the output crop window 1316 as shown in FIG. 13E.

In some implementations, a different method than the method 1100 of FIG. 11 can be used to adjust a crop window if the crop window extends past the image boundaries after a relative rotation between crop window and image. For example, instead of making the crop window smaller to fit within the image as in method 1100, the crop window can be automatically adjusted to be the same size and in the same orientation as the image.

In some implementations, the changing of the crop window to fit within image boundaries as performed in methods 600, 700, 800, and/or 1100, can be performed based on user confirmation, similarly as described above for the preview or proposed resizing to a predetermined aspect ratio. For example, the system can display a preview re-positioned and/or re-sized crop window (e.g., in another color or other differing visual indication) that fits within image boundaries according to methods 800 and 1100, without removing the user's modified crop window from the display. The user can provide additional user input to confirm/approve or reject the preview changed crop window, e.g., by selecting the changed crop window to approve or selecting the user-modified crop window to reject, by selecting a button or other response of an additional displayed prompt, etc. For example, if approved, the preview changed crop window can be displayed while the user-modified crop window is removed from the display.

In some implementations, the methods 200, 300, 800 and/or 1100 can take into account constraints when adjusting the size of any resulting crop window, such as a predetermined minimum crop window size. In other implementations, the methods can ignore any constraints on size when resizing a crop window. For example, a predetermined minimum size for a crop window can be ignored, allowing the crop window to be very small. In some examples, if a crop of the image is made at a very small size of the crop window, the cropped portion of the image can be up-sampled to enhance the resolution of the cropped portion.

Various implementations can present various options to the user to input parameters that can govern the crop size adjustment and resizing. For example, the user can be prompted to input one or more predetermined aspect ratios, minimum crop window sizes, display options (displaying indicators when within threshold for snapping to predetermined aspect ratio, whether to display target crop windows that extend beyond image boundaries), etc.

It should be noted that the blocks of any of the methods described herein can be performed in a different order than shown and/or simultaneously (partially or completely) with other blocks, where appropriate. Not all of the described blocks need be performed in various implementations. In some implementations, blocks can be performed multiple times, in a different order, and/or at different times in the methods.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

In some implementations, one or more methods can be implemented in conjunction with display of an image editing user interface on an output device of a system, such as a display screen or other type of display. For example, the user interface can be a graphical user interface (GUI) displayed on a display of a client device, e.g., a camera, phone, tablet, goggles, wearable device (watch, jewelry, etc.), laptop computer, desktop computer, head mounted display, etc. The GUI can offer editing tools for the user to select and manipulate with an input device, e.g., a touchscreen, mouse, trackpad, voice recognition microphone, etc. to edit one or more images displayed in the user interface. For example, the user interface can be provided by an image editing application or other type of application, in some implementations.

Figure 14:
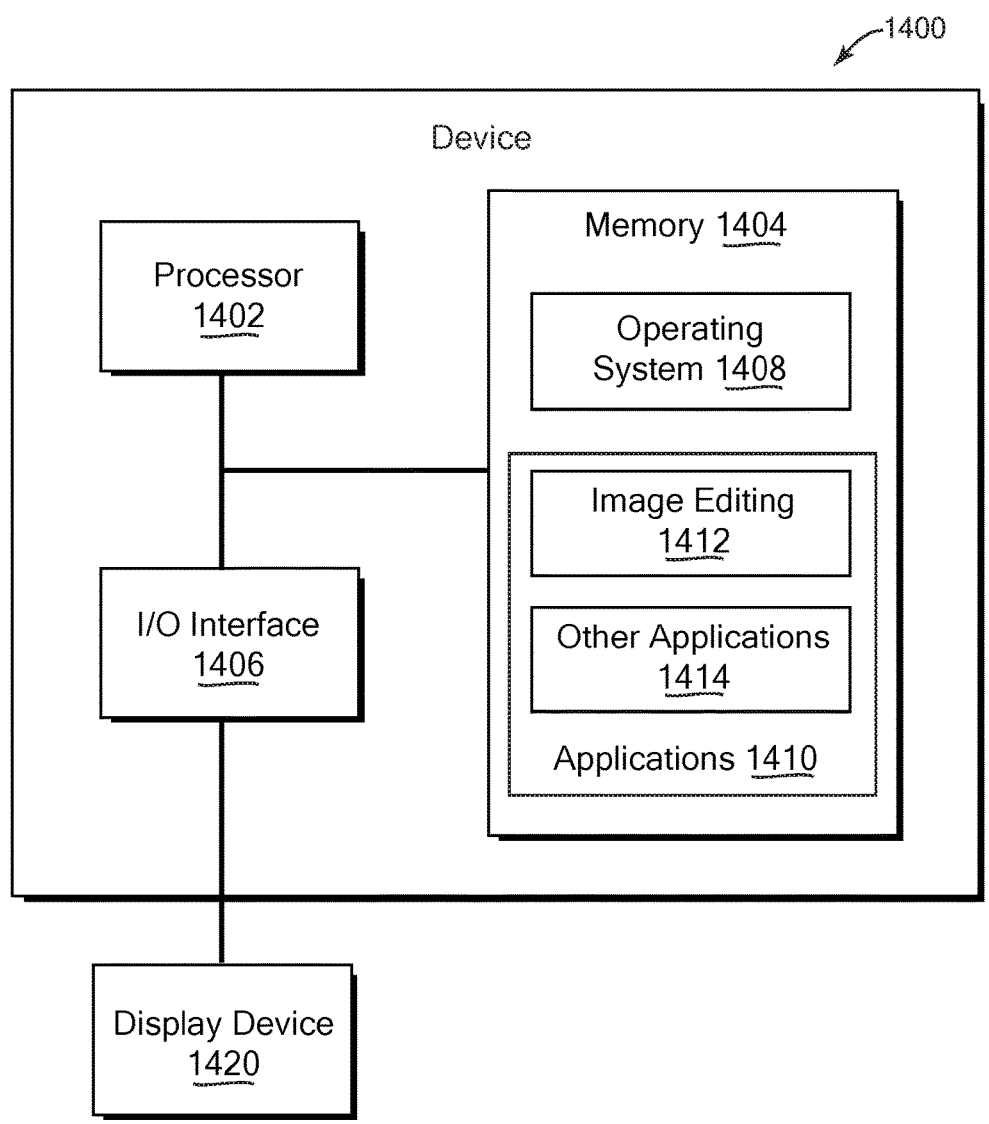
FIG. 14 is a block diagram of an example device which may be used for one or more implementations described herein.

FIG. 14 is a block diagram of an example device 1400 which may be used to implement some implementations described herein. In one example, device 1400 may be used to implement a computer device that implements a server device, e.g., server device 104 of FIG. 1, and perform appropriate method implementations described herein. Device 1400 can be any suitable computer system, server, or other electronic or hardware device. For example, the device 1400 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1400 includes a processor 1402, a memory 1404, and input/output (I/O) interface 1406.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Processor 1402 can be one or more processors and/or processing circuits to execute program code and control basic operations of the device 1400. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1404 is typically provided in device 1400 for access by the processor 1402, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1402 and/or integrated therewith. Memory 1404 can store software operating on the server device 1400 by the processor 1402, including an operating system 1408 and one or more applications 1410 such as a graphics editing engine, web hosting engine, network service engine, etc. In some implementations, the applications 1410 can include instructions that enable processor 1402 to perform the functions described herein, e.g., some or all of the methods of FIGS. 2, 3, 6, 7, 8, and 11. For example, applications 1410 can include one or more image editing applications 1412, including an image editing program to receive user input, select input images, receive user input to manipulate one or more cropping windows, modify pixels of images (e.g., by applying edit operations to an input image using a cropping window), and provide output data causing display of original and modified images on a display device of the device 1400. An image editing program, for example, can provide a displayed user interface responsive to user input to display selectable options/controls and images based on selected options. Other applications or engines 1414 can also or alternatively be included in applications 1410, e.g., media display applications, communication applications, web hosting engine or application, etc. Any of software in memory 1404 can alternatively be stored on any other suitable storage location or computer-readable medium. In addition, memory 1404 (and/or other connected storage device(s)) can store images and metadata, crop window sizes, locations, and aspect ratios, predetermined aspect ratios, other information associated with crop windows and user selections and preferences, and/or other instructions and data used in the features described herein. Memory 1404 and any other type of storage (magnetic disk, optical disk, magnetic tape, or other tangible media) can be considered "storage" or "storage devices."

I/O interface 1406 can provide functions to enable interfacing the server device 1400 with other systems and devices. For example, network communication devices, storage devices (e.g., memory and/or database 106), and input/output devices can communicate via interface 1406. In some implementations, the I/O interface can connect to interface devices including input devices (keyboard, pointing device, touchscreen, microphone, camera, scanner, etc.) and/or output devices (display device, speaker devices, printer, motor, etc.). Display device 1420 is one example of an output device that can be used to display content, e.g., one or more images provided in an image editing interface or other output application as described herein. Display device 1420 can be connected to device 1400 via local connections (e.g., display bus) and/or via networked connections and can be any suitable display device, some examples of which are described below.

For ease of illustration, FIG. 14 shows one block for each of processor 1402, memory 1404, I/O interface 1406, and software blocks 1408 and 1410. These blocks may represent one or more processors or processing circuitries, operating systems, memories, I/O interfaces, applications, and/or software modules. In other implementations, server device 1400 may not have all of the components shown and/or may have other elements including other types of elements instead of, or in addition to, those shown herein. While server system 102 is described as performing blocks and operations as described in some implementations herein, any suitable component or combination of components of system 102 or similar system, or any suitable processor or processors associated with such a system, may perform the blocks and operations described.

A client device can also implement and/or be used with features described herein, e.g., client devices 120-126 shown in FIG. 1. Example client devices can be computer devices including some similar components as the device 1400, such as processor(s) 1402, memory 1404, and I/O interface 1406. An operating system, software and applications suitable for the client device can be provided in memory and used by the processor, e.g., image editing software, client group communication application software. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 1420, for example, can be connected to or included in device 1400 to display the images pre- and post-processing as described herein, where such device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

Although the description has been described with respect to particular implementations thereof, these particular implementations are merely illustrative, and not restrictive.

Concepts illustrated in the examples may be applied to other examples and implementations.

In situations in which the systems discussed here may collect personal information about users, or may make use of personal information, users are provided with one or more opportunities to control whether programs or features collect user information (e.g., information about a user's social network, user characteristics (age, gender, profession, etc.), social actions or activities, a user's preferences, content created or submitted by a user, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user has control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
receiving user input indicative of a change in size of a crop window from a first size and a first aspect ratio to a second size and a second aspect ratio, wherein the crop window is displayed over an image in an image editing user interface;
detecting, by at least one processor, that the second aspect ratio is within a threshold range of a predetermined aspect ratio, wherein the threshold range of the predetermined aspect ratio is:
a first threshold range in response to the first aspect ratio being substantially the same as the predetermined aspect ratio; and
a second threshold range in response to the first aspect ratio not being substantially the same as the predetermined aspect ratio, wherein the second threshold range is different than the first threshold range; and
in response to the detection, resizing the crop window to a third size, wherein the crop window of the third size has a third aspect ratio substantially the same as the predetermined aspect ratio.

2. The method of claim 1 wherein the second threshold range is less than the first threshold range.

3. The method of claim 1 further comprising displaying the crop window of the third size including a visual indication that the crop window has been resized to the third size, wherein the visual indication includes a preview crop window having a displayed appearance different than the crop window of the second size.

4. The method of claim 1 further comprising:
determining that the crop window of the third size is at least partially outside one or more boundaries of the image; and
resizing the crop window to a fourth size displayable within the boundaries of the image, wherein the fourth size has an aspect ratio substantially the same as the predetermined aspect ratio.

5. The method of claim 4 wherein determining that the crop window of the third size is at least partially outside one or more boundaries of the image is based on user input providing at least one of:
movement of the crop window with respect to the image; and
resizing of the crop window of the first size.

6. The method of claim 1 further comprising displaying the crop window of the third size including a visual indication that the crop window has been resized to the third size, wherein the visual indication includes at least one of: a particular color of the crop window, a particular brightness of the crop window, a particular line pattern of the crop window, or a message displayed in the image editing user interface.

7. The method of claim 1 wherein resizing the crop window to the third size is performed in response to a speed of the change in size of the crop window from the first size to the second size being below a threshold speed.

8. The method of claim 1 wherein resizing the crop window to the third size includes resizing the crop window such that the third size is equal to or larger than a predetermined minimum size.

9. The method of claim 1 wherein the predetermined aspect ratio includes a first predetermined aspect ratio and a second predetermined aspect ratio, wherein
the crop window of the third size has an aspect ratio substantially the same as the first predetermined aspect ratio in response to the crop window of the second size having an aspect ratio within a threshold range of the first predetermined aspect ratio, and
the crop window of the third size has an aspect ratio substantially the same as the second predetermined aspect ratio in response to the crop window of the second size having an aspect ratio within a threshold range of the second predetermined aspect ratio.

10. The method of claim 1 wherein detecting that the crop window of the second size has an aspect ratio within a threshold range of a predetermined aspect ratio includes
checking an angle between diagonals or an angle between a diagonal and an edge of the crop window of the second size.

11. The method of claim 1 wherein detecting that the crop window of the second size has an aspect ratio within a threshold range of a predetermined aspect ratio includes
determining an arithmetic mean of the height and width of the crop window of the second size and checking whether the crop window of the second size has a height and width within a predetermined threshold of the arithmetic mean.

12. A system comprising:
a storage device; and
at least one processor accessing the storage device and configured to perform operations comprising:
causing a display of a crop window of a first size and a first aspect ratio in an image editing interface;
receiving user input indicative of a resize to update the size of the crop window of the first size;

in response to the user input, resizing the crop window to a second size and a second aspect ratio;

detecting, by the at least one processor, whether the second aspect ratio is within a threshold range of a predetermined aspect ratio, wherein the threshold range of the predetermined aspect ratio is:
- a first threshold range in response to the first aspect ratio being substantially the same as the predetermined aspect ratio; and
- a second threshold range in response to the first aspect ratio not being substantially the same as the predetermined aspect ratio, wherein the second threshold range is different than the first threshold range; and in response to the detection, resizing the crop window to a third size, wherein the crop window of the third size is
sized substantially to the predetermined aspect ratio.

13. The system of claim 12 wherein the processor further performs operations comprising:
determining that the crop window of the second size has at least one vertex positioned outside one or more of the boundaries of the image, wherein resizing the crop window to a third size includes resizing the crop window to be displayed within the boundaries of the image.

14. The system of claim 12 wherein the operation of resizing the crop window to the third size is performed in response to a speed of the resizing the crop window to the second size being below a threshold speed.

15. The system of claim 12 further comprising causing a display of a visual indication that the crop window has been resized to the third size, wherein the visual indication includes a preview crop window having a displayed appearance different than the crop window of the second size, and further comprising receiving user input confirming to resize the crop window of the second size to the third size.

16. The system of claim 12 wherein resizing the crop window to a third size includes:
extending lines between corresponding vertices of the crop window of the first size and the crop window of the second size to determine one or more intersections with one or more boundary lines of the image; and
determining the crop window of the third size based on a selected intersection of the one or more intersections with the one or more boundary lines of the image.

17. The system of claim 12 wherein the crop window of the first size and the crop window of the second size each have a first vertex and a second vertex, wherein the second vertex of the crop window of the second size is positioned outside one or more of the boundaries of the image, and
wherein resizing the crop window to a third size includes:
extending lines between corresponding vertices of the crop window of the first size and the crop window of the second size for intersection with one or more boundary lines of the image; and
determining the crop window of the third size as having a first vertex substantially the same as the first vertex of the crop window of the first size and a second vertex at or inside a selected one of the intersections with the one or more boundary lines of the image that is nearest to the second vertex of the crop window of the first size.

18. A nontransitory computer readable medium having stored thereon software instructions that, when executed by a processor, cause the processor to perform operations including:
receiving user input indicative of a change in size of a crop window from a first size and a first aspect ratio to a second size and a second aspect ratio, wherein the crop window is displayed over an image in an image editing user interface;
detecting that the second aspect ratio is within a threshold range of a predetermined aspect ratio, wherein the threshold range of the predetermined aspect ratio is:
- a first threshold range in response to the first aspect ratio being substantially the same as the predetermined aspect ratio; and
- a second threshold range in response to the first aspect ratio not being substantially the same as the predetermined aspect ratio, wherein the second threshold range is different than the first threshold range;

in response to the detection, displaying the crop window with a third size over the image in the image editing user interface, wherein the crop window of the third size has a third aspect ratio substantially the same as the predetermined aspect ratio; and
causing a display of a visual indication that the crop window has been resized to the third size.

19. The computer readable medium of claim 18 wherein the processor further performs operations comprising:
determining that the crop window of the third size is at least partially outside one or more boundaries of the image based on user input providing at least one of:
movement of the crop window with respect to the image; and
resizing of the crop window of the first size; and
resizing the crop window to a fourth size displayable within the boundaries of the image, wherein the fourth size has an aspect ratio substantially the same as the predetermined aspect ratio.

20. The computer readable medium of claim 18 wherein the visual indication that the crop window has been resized to the third size includes a preview crop window having a displayed appearance different than the crop window of the second size, and further comprising receiving user input confirming to resize the crop window of the second size to the third size.

* * * * *